(12) United States Patent
Hilborn

(10) Patent No.: US 8,379,574 B2
(45) Date of Patent: Feb. 19, 2013

(54) SYSTEMS AND METHODS FOR MITIGATING INTERCELL INTERFERENCE BY COORDINATED SCHEDULING AMONGST NEIGHBORING CELLS

(75) Inventor: Derek Hilborn, Kirkland, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 251 days.

(21) Appl. No.: 12/963,484

(22) Filed: Dec. 8, 2010

(65) Prior Publication Data

US 2011/0235598 A1  Sep. 29, 2011

Related U.S. Application Data

(60) Provisional application No. 61/317,477, filed on Mar. 25, 2010.

(51) Int. Cl.
*H04W 4/00* (2009.01)
(52) U.S. Cl. ......................................... 370/328; 370/331
(58) Field of Classification Search ................ 370/310.2, 370/328, 331, 332, 333, 338
See application file for complete search history.

(56) References Cited

U.S. PATENT DOCUMENTS

| 7,974,652 | B2 * | 7/2011 | Gerlach et al. | 455/522 |
| 8,194,630 | B2 * | 6/2012 | Qvarfordt et al. | 370/338 |
| 2007/0280170 | A1 * | 12/2007 | Kawasaki | 370/331 |

* cited by examiner

*Primary Examiner* — Brenda H Pham

(57) ABSTRACT

A networked computing system capable of mitigating interference amongst neighboring base stations. The networked computing system includes multiple base stations, user equipment, a network resource controller, and a data communications network facilitating data communications amongst all network devices. A serving base station is configured to acquire interference metrics from its local user equipment and then generate an aggregate representation from the acquired interference metrics. The network resource controller is configured to acquire the aggregate representation, determine an interference reduction associated with a neighbor base station for each of the user equipment serviced by the serving base station, determine a power schedule for the first base station based on the aggregate representation and the determined interference reduction, and then modify a power schedule for the neighbor base station based on the determined interference reduction.

20 Claims, 14 Drawing Sheets

| Base | Excess CINR (slots) | | | | | | | | | Scheduled Power (dB) by slot | | | | | | | | | |
|---|---|---|---|---|---|---|---|---|---|---|---|---|---|---|---|---|---|---|---|
| | -20 | -15 | -10 | -5 | 0 | +5 | +10 | +15 | +20 | 0 | 1 | 2 | 3 | 4 | 5 | 6 | 7 | 8 | 9 |
| Serving Base | 0 | 0 | 1 | 2 | 2 | 2 | 1 | 0 | 0 | 0 | 0 | - | - | - | - | - | - | - | - |
| Interfering Base A (rank=18) | 0 | 0 | 0 | 0 | 2 | 2 | 1 | 0 | 0 | 0 | 0 | 0 | 0 | 0 | - | - | - | - | - |
| Interfering Base B (rank=534) | 1 | 0 | 1 | 3 | 0 | 0 | 0 | 0 | 0 | -10 | -5 | -5 | 0 | 0 | - | - | - | - | - |
| Interfering Base C (rank=999) | 0 | 1 | 2 | 2 | 1 | 2 | 0 | 0 | 0 | -15 | -10 | - | - | - | - | - | - | - | - |

FIG. 11

SYSTEMS AND METHODS FOR MITIGATING INTERCELL INTERFERENCE BY COORDINATED SCHEDULING AMONGST NEIGHBORING CELLS

CROSS REFERENCE TO RELATED APPLICATIONS

The present application claims the benefit of U.S. Provisional Application No. 61/317,477, filed Mar. 25, 2010, incorporated herein by reference.

FIELD OF THE INVENTION

The field of the present invention generally relates to emerging 4G self-organized networks (SoN networks), where manual intervention on the part of service providers can be significantly reduced or eliminated as a result of employing improved radio resource allocation solutions. More specifically, the systems and methods of the present invention relate to intercell interference mitigation and dynamic communications resource scheduling.

BACKGROUND OF THE INVENTION

In modern homogeneous and heterogeneous cellular network topologies, large numbers of base stations, operating on similar licensed frequency spectra, are being utilized by network access providers to accommodate a growing demand for increased network capacity. In networks where neighboring network cells have overlapping wireless coverage areas, it is particularly important for service providers to be able to accurately determine which network communications resources should be allocated during various scheduling tasks in order to most efficiently facilitate communications for network service subscribers located within the overlapping regions. Generally, subscriber diversity in these cell areas can lead to unique network resource consumption and co-channel interference patterns. Traffic densities in these localities may vary widely throughout the course of any particular day, on a time-varying basis. Accordingly, compensating for these phenomena becomes more challenging as wireless communications technologies evolve in response to increased consumer demand.

Today, commercial cellular deployments are utilized to provide a larger breadth of digital communications services to varying types of distributed network clientele communicating with both dated and cutting-edge wireless computing devices. For example, many users residing within metropolitan regions of a cellular network have access to relatively high network throughput service. This service may be associated with enhanced data-rate plans that can include high bandwidth service offerings. Relatively high usage subscribers (e.g., those consuming a disproportionate percentage of available network bandwidth) may utilize local network resources to transfer large amounts of Internet-based data to and from their cellular communications device(s) over the course of a single day. Conversely, other wireless subscribers, with lesser network service (e.g., those with lower bandwidth data rate plans or dated communications devices), may use local network resources primarily for voice data communications. As would be understood by those skilled in the Art, network throughput is generally defined as an average rate of successful data communications delivery over a particular network communications channel per unit of time. This throughput is usually measured in bits per second (bps) or alternately in data packets per second. Generally, service providers wish to maximize network throughput to ensure that they can reliably accommodate consumer demand in accordance with defined communications quality levels.

As the number of active users in a particular wireless communications network increases, the problem of intercell interference (co-channel interference amongst neighboring network cells) increases, and it becomes more and more important for service providers to be able to properly manage radio frequency resources that are shared amongst regional network cells, particularly in networks employing frequency reuse assignment. By way of example, neighboring cells having overlapping coverage areas might share a fixed number of wireless communication channels, and on any given day, a particular network cell may experience detrimentally reduced network capacity and/or quality, based on heavy subscriber usage of its limited, available network resources (e.g., available communications channel bandwidth) and on intercell interference emanating from neighboring cells. Generally, intercell interference most significantly impacts users communicating near the edge or periphery of a serving cells coverage area.

Modern channel allocation schemes generally allocate full downlink transmit power to distributed user equipment, regardless of their position within a serving cell. Accordingly, these resource allocation schemes fail to adequately account for the conservative, sufficient power levels actually required to successfully close radio links between base stations and their locally served user equipment. Systems such as these generally operate in either full power mode or zero power mode, without any power scaling mechanism or dimension of power weighting. In this environment, scheduled channel resources that facilitate user equipment communications are generally either ON or OFF. When full power mode is employed in adjacent edge regions of neighboring cells, power levels may generally be considered to be overpowered. A problem arises when a serving cell's neighbor cells employ the same overpowered scheduling technique. In this scenario, uncoordinated, non-weighted scheduling gives rise to the problem of co-channel interference and it typically results in wasted network resources and decreased communications throughput.

In recent years, OFDMA (orthogonal frequency division multiple access) has emerged as an evolving physical layer technology for 4G wireless networks. 4G wireless networks have created an increased demand for higher system capacity and improved QoS, and as a result, the problem of poor cell edge performance due to co-channel intercell interference has become an even larger problem than it was for 3G and 3GPP LTE networks. In modern wireless cellular communication systems, cell edge users (users having low carrier to interference plus noise ratio or CINR) regularly suffer from severe intercell interference, and as a result, they generally achieve far lower throughput than users located in the central regions of a network cell (users having high CINR). This not only degrades overall system throughput, but it also causes a wide variation in the QoS levels among varying user types residing in different regions of a serving network cell.

As previously discussed, cell power scheduling in modern OFDMA systems is most often employed independently of similar scheduling performed at neighboring network cells. What is needed are improved solutions for coordinating power scheduling (particularly on the downlink) amongst neighboring network cells to effectively reduce the impact of inter-cell interference and to improve cell edge performance for peripheral network users. Several interference mitigation solutions have been proposed in an attempt to solve these problems. Unfortunately, these solutions have inherent deficiencies that hinder system performance and/or efficient network resource utilization.

One previously proposed solution is intercell interference randomization. This technique essentially randomizes interfering signals, and thereby facilitates interference suppression. As would be understood by those skilled in the Art, this approach may include: interleave division multiple access and slow frequency hopping. These techniques merely randomize intercell interference into noise and accordingly intercell interference randomization techniques fail to achieve substantial performance improvement. Another proposed solution is interference cancellation. This technique demodulates and cancels interference via multi-user detection methods at the receiver. However, these techniques generally suffer from high complexity and detrimentally increased consumer resource overhead. As a result, from a practical perspective, this solution can only result in a limited amount of interference being cancelled in a typical wireless communications network. Accordingly, the effect of interference cancellation alone is insufficient as it cannot solve intercell interference problems associated with modern cellular networks.

Another proposed solution is a type of interference coordination, known as fractional frequency reuse (FFR). FFR aims at using orthogonal frequency resources among neighboring cells' edge users to actively mitigate intercell interference. Implementation of this approach has a low complexity and FFR can improve performance. However, FFR has several key deficiencies. Depending on the specific implementation, since a cell-edge user can only use part of a frequency band, the user can suffer from loss of frequency selectivity gain. Additionally, since FFR schemes are in general statically configured, they do not react to networks with non-uniform loading across the network. This generally leads to a non-optimal system throughput. As would be understood by those skilled in the Art, there are also several other inherent problems associated with using FFR as a solution for modern intercell interference problems that make alternative solutions desirable.

As existing intercell interference solutions fail to adequately solve the problem of intercell interference amongst neighboring network cells, it would be beneficial to be able to more efficiently allocate network resources amongst nearby cells having overlapping coverage areas. This would help to improve network resource utilization amongst regional network cells and it would also improve QoS levels experienced by users communicating at a particular cell's edge. Negative effects associated with poor QoS (e.g., conditions commonly caused by co-channel interference), which can be mitigated by optimizing network resource allocation using improved network resource scheduling, may include: queuing delay, data loss, as well as blocking of new and existing network connections for certain network subscribers.

Accordingly, there remains a need for systems and methods that employ improved network resource allocation solutions to better compensate for intercell interference problems amongst neighboring network cells. It would be helpful if these solutions offered robust power scheduling solutions that emphasized coordinated scheduling while requiring minimal operational overhead. In this way, it would be easier for service providers to readily allocate network resources to network service subscribers in a time efficient manner, in the presence of dynamically changing network environments. It would also be helpful if these solutions took advantage of existing network resources, such that various network cells could independently determine their own downlink data schedules with minimal input from neighboring cells and/or centralized controlling entities. These improved network optimization solutions would effectively reduce the level of required human intervention for successful network resource allocation operations. This in turn would result in operational savings for service providers, and it would provide for many other performance, quality, and operational benefits. The importance of these benefits would be readily understood by those familiar with the multitude of benefits commonly associated with self-organized network (SoN) solutions.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming disadvantages associated with existing interference mitigation solutions, the present invention discloses a networked computing system for mitigating interference amongst neighboring base stations. The networked computing system includes multiple base stations, multiple user equipment, at least one network resource controller, and a data communications network facilitating data communications amongst the base stations, the user equipment, and the network resource controller(s). In an embodiment, a first base station is configured to acquire interference metrics from one or more user equipment and then generate an aggregate representation from the acquired interference metrics. The network resource controller is configured to acquire the aggregate representation, determine an interference reduction associated with a second base station for each of the user equipment serviced by the first base station, determine a power schedule for the first base station based on the aggregate representation and the determined interference reduction, and then modify a power schedule for the second base station based on the determined interference reduction.

In accordance with another aspect of the invention, the determined power schedule for the first base station and the modified power schedule for the second base station are both downlink power schedules.

In accordance with yet another aspect of the invention, the modified power schedule for the second base station is configured to reduce interference for the user equipment serviced by the first base station.

In accordance with a further aspect of the invention, the network resource controller is configured to determine an interference reduction associated with a third base station for each of the user equipment serviced by the first base station and to modify a power schedule for the third base station based on the determined interference reduction associated with the third base station.

In accordance with another aspect of the invention, the determined power schedules for the second and the third base stations are configured to reduce interference for the user equipment serviced by the first base station.

In accordance with yet a further aspect of the invention, the network resource controller is configured to determine the interference reductions associated with the second and the third base stations by ranking the second and the third base stations in accordance with their proportional interference impact to the user equipment serviced by the first base station.

In accordance with yet another aspect of the invention, the first base station generates a histogram of interference metrics and then transmits the histogram to the network resource controller to facilitate centralized power scheduling for neighboring base stations.

In accordance with a further aspect of the invention, is a computer-readable medium encoded with computer-executable instructions for mitigating interference amongst neighboring base stations, which when executed, performs a method including the processes of: acquiring interference metrics from one or more user equipment at a first base station, generating an aggregate representation from the acquired interference metrics, acquiring the aggregate representation at a network resource controller, determining an interference reduction associated with a second base station for each of the user equipment serviced by the first base station, determining a power schedule for the first base station based on the aggregate representation and the determined interference reduction, and modifying a power schedule for the second base station based on the determined interference reduction.

In accordance with another aspect of the invention, is a computer-implemented method for mitigating interference amongst neighboring base stations, the method includes the processes of: acquiring interference metrics from one or more user equipment at a first base station, generating an aggregate representation from the acquired interference metrics, acquiring the aggregate representation at a network resource controller, determining an interference reduction associated with a second base station for each of the user equipment serviced by the first base station, determining a power schedule for the first base station based on the aggregate representation and the determined interference reduction, and modifying a power schedule for the second base station based on the determined interference reduction.

In accordance with yet a further aspect of the invention, is a network resource controller for mitigating interference amongst neighboring base stations, the network resource controller includes at least one memory, at least one processor, and a data communications component. In an embodiment, the network resource controller is configured to acquire an aggregate representation of user equipment interference metrics from a first base station, determine an interference reduction associated with a second base station for each of the user equipment, determine a power schedule for the first base station based on the aggregate representation and the determined interference reduction, and modify a power schedule for the second base station based on the determined interference reduction.

BRIEF DESCRIPTION OF THE DRAWINGS

Preferred and alternative examples of the present invention are described in detail below with reference to the following Figure drawings:

FIG. 9 illustrates an excess CINR table and an associated power schedule for a serving base station and its strongest interfering neighbor base stations in accordance with an embodiment of the invention;

FIG. 10 illustrates an excess CINR table and an associated first power slot scheduling process for a serving base station and its strongest interfering neighbor base stations in accordance with an embodiment of the invention;

FIG. 11 illustrates an excess CINR table and an associated additional power slot scheduling process for a serving base station and its strongest interfering neighbor base stations in accordance with an embodiment of the invention;

DETAILED DESCRIPTION

Figure 1:
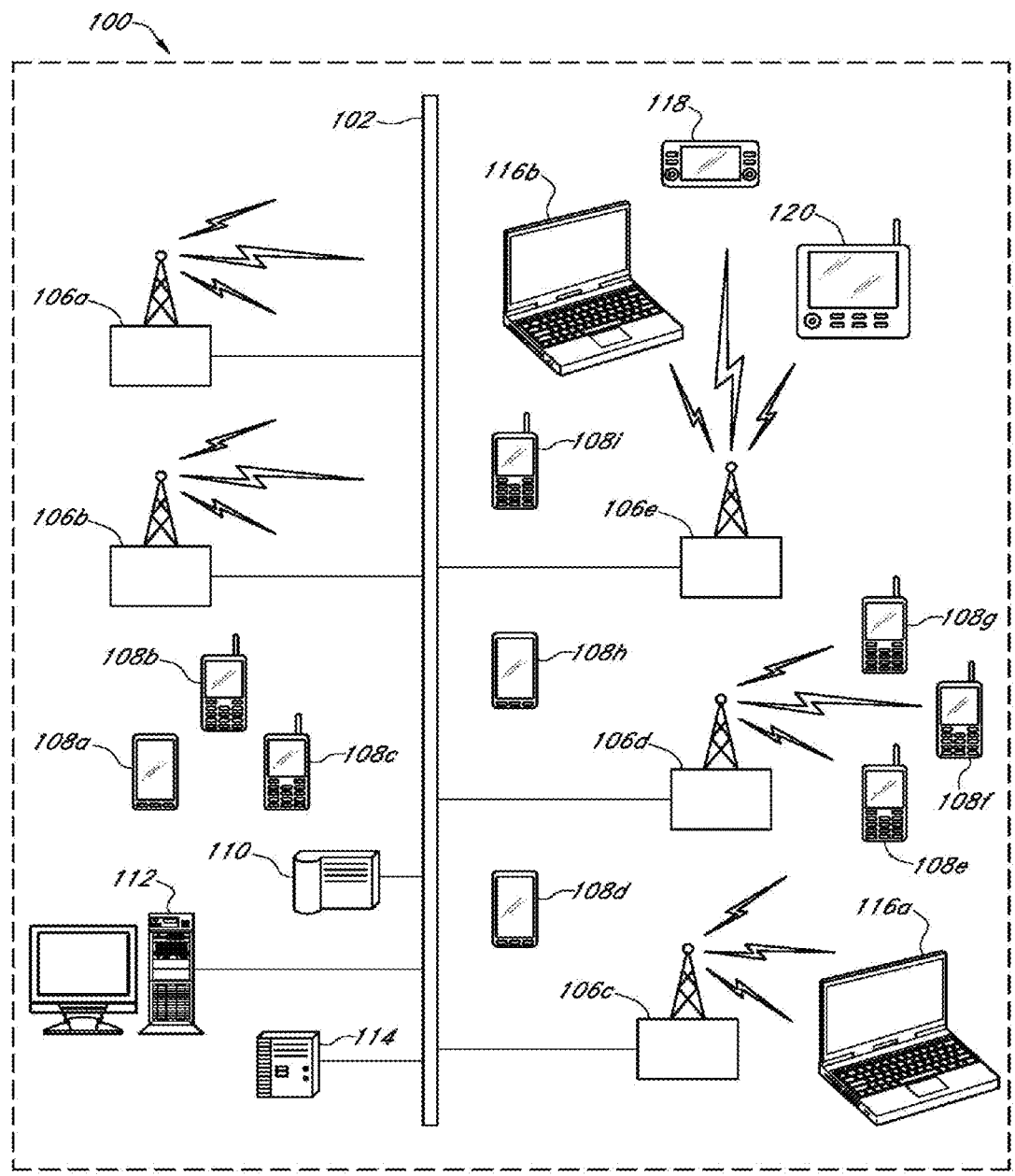
FIG. 1 illustrates a perspective view of a distributed data communications system in accordance with an embodiment of the invention.

In accordance with an exemplary embodiment of the present invention, FIG. 1 illustrates a networked computing system 100 including various wireline and wireless computing devices that may be utilized to implement any of the interference mitigation processes associated with various embodiments of the present invention. These processes may include, but are not limited to network communications state determinations (e.g., interference metric determinations), network resource monitoring, neighboring cell negotiations/rankings, and intercell power scheduling processes. The networked computing system 100 may include, but is not limited to, a group of service provider controller devices 110, 112, and 114 (any of which may be Network Resource Controllers (NRCs) or have NRC functionality, defined further herein); network base stations 106a-e (any of which may be NRCs or have NRC functionality) that may share overlapping wireless coverage with one or more neighboring base stations within a particular region of the networked computing system 100; multiple user equipment, including: cell phone/PDA devices 108a-i, laptop/netbook computers 116a-b, handheld gaming units 118, electronic book devices or tablet PCs 120, and any other type of common portable wireless computing device known in the Art that may be provided wireless communications service by any of the network base stations 106a-e; and a data communications network 102, including a backhaul portion that can facilitate distributed network communications between any of the network controller devices 110, 112, and 114 and any of the network base stations 106a-e.

As would be understood by those skilled in the Art, in most digital communications networks, the backhaul portion of a data communications network 102 may include the intermediate, generally wireline, links between a backbone of the network, and the sub-networks or network base stations 106a-e located at the periphery of the network. For example, cellular user equipment (e.g., any of user equipment 108a-i, 116a-b, 118, and 120) communicating with one or more network base stations 106a-e may constitute a local sub-network. Whereas the network connection between any of the network base stations 106a-e and the rest of the world initiates with a link to the backhaul portion of an access provider's communications network 102 (e.g., via a point of presence).

It should be understood that a Network Resource Controller or NRC, as described herein, is considered to be a physical and/or a software-based entity that can facilitate any or part of the interference mitigation processes associated with various embodiments of the present invention. In accordance with an embodiment of the present invention, a NRC that performs a particular interference mitigation process may be considered to be a physical device, such as a network controller device 110, 112, and 114 or a network base station 106a-e. In yet another embodiment, a NRC that performs a particular network interference mitigation process may be considered to be a logical software-based entity that can be stored in the volatile or non-volatile memory or memories of a physical device, such as a network controller device 110, 112, and 114, or a network base station 106a-e. In accordance with various embodiments of the present invention, the NRC has presence and functionality that can be defined by the very processes it is capable of carrying out. Accordingly, the conceptual entity that is the NRC is generally defined by its role in performing processes associated with various interference mitigation processes. Therefore, depending on the particular embodiment being disclosed, the NRC entity may be considered to be either a physical device or a software component that is stored in the memory or memories of one or more communicating device(s) within a networked computing system 100.

In an embodiment, any of the service provider controller devices 110, 112, and 114, and/or network base stations 106a-e (optionally having NRC functionality or considered to be a NRC) may function independently or collaboratively to implement any of the interference mitigation processes associated with various embodiments of the present invention. Further, any of the interference mitigation processes may be carried out via any common communications technology known in the Art, such as those associated with modern Global Systems for Mobile (GSM), Universal Mobile Telecommunications System (UMTS), Long Term Evolution (LTE) network infrastructures, etc. In accordance with a standard GSM network, any of the service provider controller devices 110, 112, and 114 (NRC devices or optionally having NRC functionality) may be associated with a base station controller (BSC), a mobile switching center (MSC), or any other common service provider control device known in the art, such as a radio resource manager (RRM). In accordance with a standard UMTS network, any of the service provider controller devices 110, 112, and 114 (optionally having NRC functionality) may be associated with a network resource controller (NRC), a serving GPRS support node (SGSN), or any other common service provider controller device known in the art, such as a radio resource manager (RRM). In accordance with a standard LTE network, any of the service provider controller devices 110, 112, and 114 (optionally having NRC functionality) may be associated with an eNodeB base station, a mobility management entity (MME), or any other common service provider controller device known in the art, such as a radio resource manager (RRM).

In an embodiment, any of the service provider controller devices 110, 112, and 114, the network base stations 106a-e, as well as any of the user equipment 108a-i, 116a-b, 118, and 120 may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, etc. In an embodiment, any of the service provider controller devices 110, 112, and 114, or any of the network base stations 106a-e may employ any number of common server, desktop, laptop, and personal computing devices.

In an embodiment, any of the user equipment 108a-i, 116a-b, 118, and 120 may be associated with any combination of common mobile computing devices (e.g., laptop computers, netbook computers, tablet computers, cellular phones, PDAs, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and powerline cable, along with any other wireless communication technology known in the art. In an embodiment, any of the service provider controller devices 110, 112, and 114, the network base stations 106a-e, and user equipment 108a-i, 116a-b, 118, and 120 may include any standard computing software and hardware necessary for processing, storing, and communicating data amongst each other within the networked computing system 100. The computing hardware realized by any of the network computing system 100 devices (e.g., any of devices 106a-e, 108a-i, 110, 112, 114, 116a-b, 118, and 120) may include, but is not limited to: one or more processors, volatile and non-volatile memories, user interfaces, transcoders, modems, wireline and/or wireless communications transceivers, etc.

Further, any of the networked computing system 100 devices (e.g., any of devices 106a-e, 108a-i, 110, 112, 114, 116a-b, 118, and 120) may include one or more computer-readable media (e.g., any common volatile or non-volatile memory type) encoded with a set of computer readable instructions, which when executed, can perform a portion of any of the interference mitigation processes associated with various embodiments of the present invention. In context with various embodiments of the present invention, it should be understood that wireless communications coverage associated with various data communication technologies (e.g., network base stations 106a-e) typically vary amongst different service provider networks based on the type of network and the system infrastructure deployed within a particular region of a network (e.g., differences amongst GSM, UMTS, LTE, LTE Advanced, and WiMAX based networks and the technologies deployed in each network type).

Figure 2:
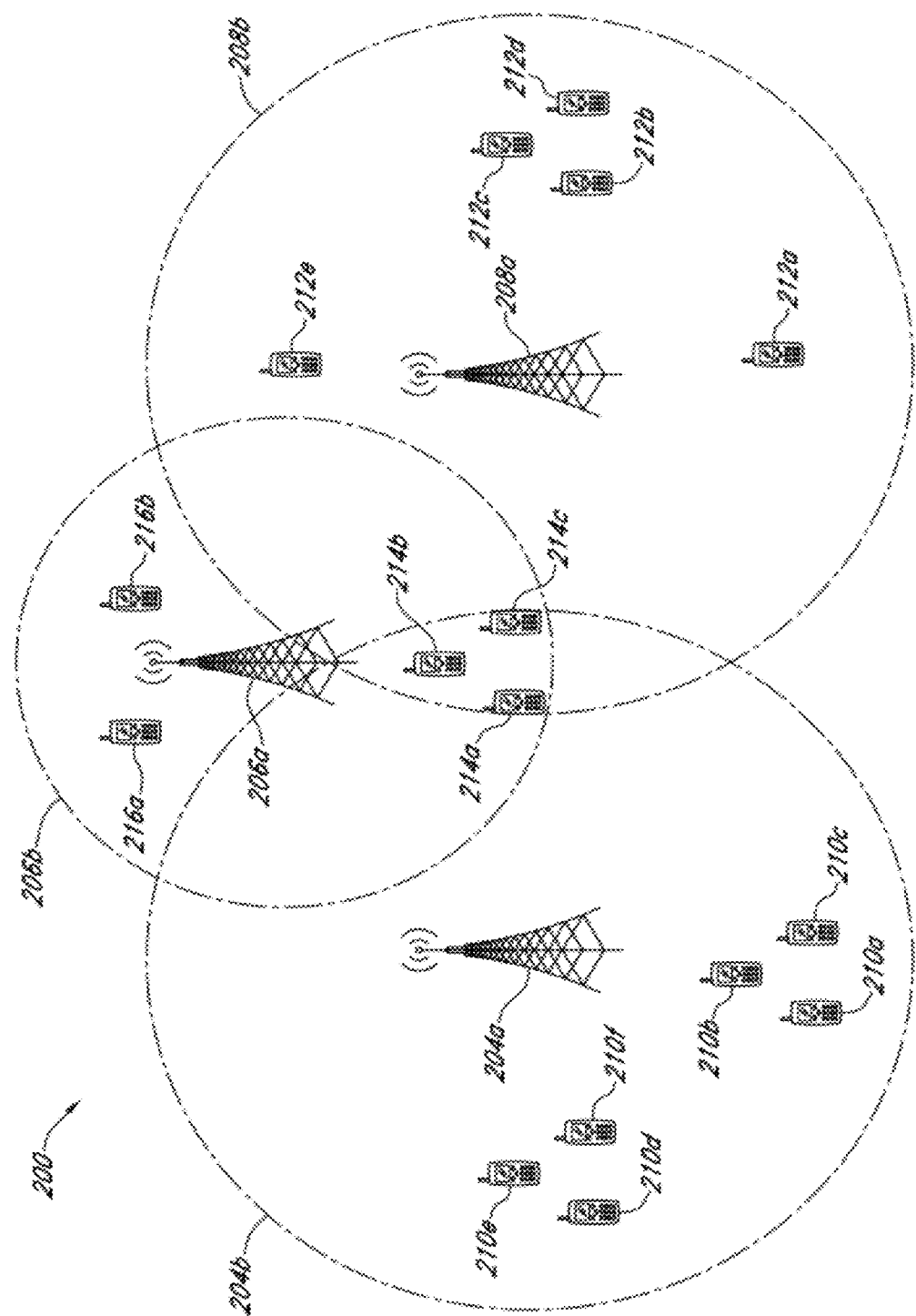
FIG. 2 illustrates a perspective view of a data communications network topology showing overlapping communications coverage areas for network devices in accordance with an embodiment of the invention.

FIG. 2 illustrates a network topology 200 including various network base stations 204a, 206a, and 208a having overlapping coverage areas 204b, 206b, and 208b that may be part of a larger data communications network (e.g., 100 of FIG. 1), as well as various user equipment 210a-f, 212a-e, 214a-c, and 216a-b that may be geographically located within the respective coverage areas 204b, 206b, and 208b of any of network base stations 204a, 206a, and 208a. The network base stations 204a, 206a, and 208a and user equipment 210a-f, 212a-e, 214a-c, and 216a-b depicted in FIG. 2 may be representative of any of the network base stations 106a-e or user equipment 108a-i, 116a-b, 118, and 120 depicted in FIG. 1.

In an embodiment, the network topology 200 may be consistent with, but is not limited to, any common LTE, LTE Advanced, GSM, UMTS, and/or WiMAX based network topology. In particular, the network topology 200 depicts overlapping cell coverage areas amongst various network cells (e.g., homogeneous or heterogeneous mixtures of network cells) and various user equipment 210a-f, 212a-e, 214a-c, and 216a-b that may be independently and dynamically distributed within the coverage areas 204b, 206b, and 208b of multiple network base stations 204a, 206a, and 208a. In an embodiment, user equipment 210a-f, may be representative of any of the user equipment 108a-i, 116a-b, 118, and 120 of FIG. 1, are geographically positioned within the cell coverage area 204b of network base station 204a, and accordingly, user equipment 210a-f may not experience substantial intercell, co-channel interference from either base station 206a or 208a; user equipment 212a-e, which may be representative of any of the user equipment 108a-i, 116a-b, 118, and 120 of FIG. 1, are geographically positioned solely within the cell coverage area 208b of network base station 208a, and accordingly, user equipment 212a-e may not experience substantial intercell, co-channel interference from either base station 204a or 206a; and user equipment 216a-b, which may be representative of any of the user equipment 108a-i, 116a-b, 118, and 120 of FIG. 1, are geographically positioned solely within the cell coverage area 206b of network base station 206a, and accordingly, user equipment 216a-b may not experience substantial intercell co-channel interference from either base station 204a or 208a.

In contrast, user equipment 214a-c, which may be representative of any of the user equipment 108a-i, 116a-b, 118, and 120 of FIG. 1, is geographically positioned within overlapping cell coverage areas 204b, 206b, and 208b of network base stations 204a, 206a, and 208a, and although user equipment 214a-c may be selectively serviced by base station 206a, these user equipment 214a-c may also experience substantial intercell co-channel interference from neighboring base stations 204a and 208a. As would be understood by those skilled in the Art, in most real world scenarios, intercell, co-channel interference generally occurs at the periphery of most cells that are bordered by or sharing a geographic coverage area with one or more neighboring cells. Accordingly, it should be understood that the network topology illustratively depicted in FIG. 2 is only being utilized to depict simplified concepts associated with intercell interference.

In this scenario, various service provider controller devices 110, 112, and 114 (optionally acting as NRCs or possessing NRC functionality) and/or any of network base stations 204a, 206a, and 208a (optionally acting as NRCs or possessing NRC functionality), as well as any of the distributed user equipment 210a-f, 212a-e, 214a-c, and 216a-b, may be configured to perform a portion of any of the interference mitigation processes associated with various embodiments of the present invention. In an embodiment, network communications state determinations may require any of the user equipment 214a-c experiencing co-channel interference to measure and/or determine various interference metrics (e.g., carrier power from a serving base station, noise power, interference powers from neighboring base stations, CINR, etc.) in order to facilitate further coordinated downlink power scheduling operations. In an embodiment, any of the network base stations 204a, 206a, and 208a may carry out various interference metric determinations based on user equipment 214a-c feedback which generally will include interference metric measurement data (e.g., carrier power from a serving base station, noise power, interference powers from neighboring base stations, etc.). These determinations may facilitate further coordinated downlink power scheduling operations to be carried out by a NRC entity.

In an embodiment, neighboring cell negotiations and determinations relating to various interference mitigation processes may require any pair or group of network base stations 204a, 206a, and 208a (any of which may be optionally acting as an NRC or possess NRC functionality), having overlapping coverage, to communicate amongst each other in order to facilitate autonomous and/or collective determinations associated with each network base station's 204a, 206a, and 208a preferred, coordinated downlink power schedule. In other embodiments, neighboring cell negotiations relating to various interference mitigation processes may also occur at a separate NRC entity (not shown) that may be one or more service provider controller devices 110, 112, and 114 (optionally acting as NRCs or possessing NRC functionality). In these embodiments the NRC may be responsible for acquiring various interference metrics from distributed user equipment 214a-c feedback (e.g., carrier power from a serving base station, noise power, interference powers from neighboring base stations, CINR, etc.). Based on this feedback (and various base station interference ranking information, discussed further herein) the controlling NRC may be able to make determinations associated with each network base station's 204a, 206a, and 208a preferred, coordinated downlink power schedule. The preferred, coordinated power schedules for the base stations 204a, 206a, and 208a are generally allocated to maximally reduce co-channel intercell interference and to improve system throughput for a group of neighboring network cells.

Figure 3:
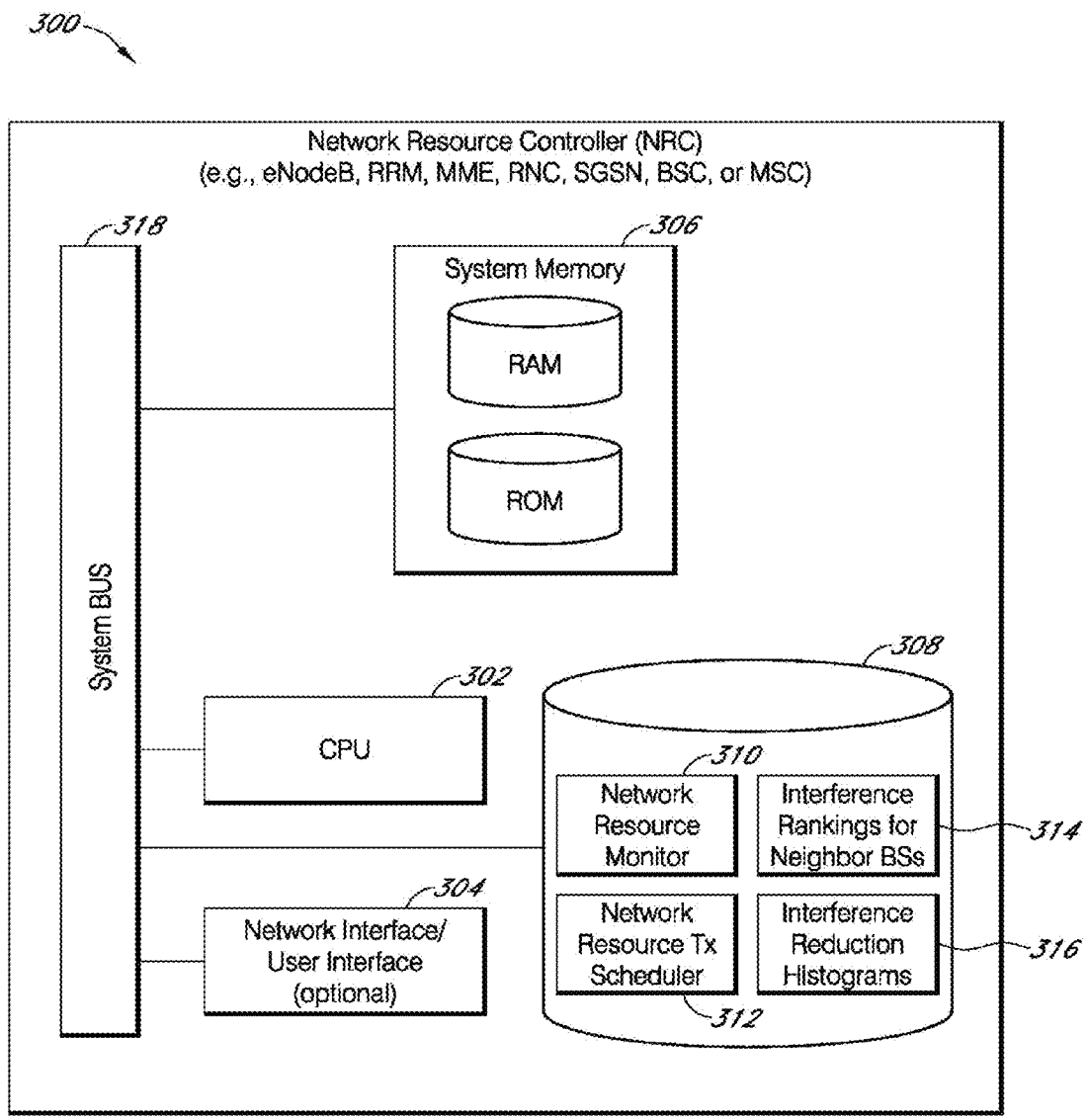
FIG. 3 illustrates a block diagram view of a network resource controller (NRC) in accordance with an embodiment of the invention where the NRC is a defined to be a physical device.

FIG. 3 illustrates a block diagram view of a NRC 300 that may be representative of any of the network base stations 106a-e or any of the network controller devices 110, 112, and 114 depicted in FIG. 1. In accordance with an embodiment of the present invention, the NRC 300 may be associated with any common base station or network controller device known in the Art, such as an eNodeB (optionally comprising a wireless modem), RRM, MME, RNC, SGSN, BSC, MSC, etc. The NRC 300 may include, but is not limited to, one or more data processing devices including a central processing unit (CPU) 302. In an embodiment, the CPU 302 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 302 may be responsible for executing all computer programs stored on the NRC's 300 volatile (RAM) and nonvolatile (ROM) system memories, 306 and 308.

The NRC 300 may also include, but is not limited to, a network interface/optional user interface component 304 that can facilitate the NRC's 300 communication with the backhaul 102 portion or the wireless portions of the network computing system 100 of FIG. 1, and may facilitate a user or network administrator accessing the NRC's 300 hardware and/or software resources; a software/database repository 308 including: a network resource monitor component 310 that is capable of monitoring a present state of dynamically changing network environments and the corresponding effect of these changes on various network resources (e.g., on user equipment communications quality and network throughput), a network resource transmit power scheduler 312 that is capable of generating downlink power schedule(s) for one or more neighboring network base stations (e.g., any of network base stations 106a-e), a repository including readily-updatable interference rankings for neighboring network base stations 314 that include interference level data amongst neighboring network base stations (e.g., the intercell interference impact of one base station's communications on its neighbor(s)), and a repository of interference reduction histograms 316 that may also include determined excess CINR histogram data; and a system bus 318 that facilitates data communications amongst all the hardware resources of the NRC 300.

Figure 4:
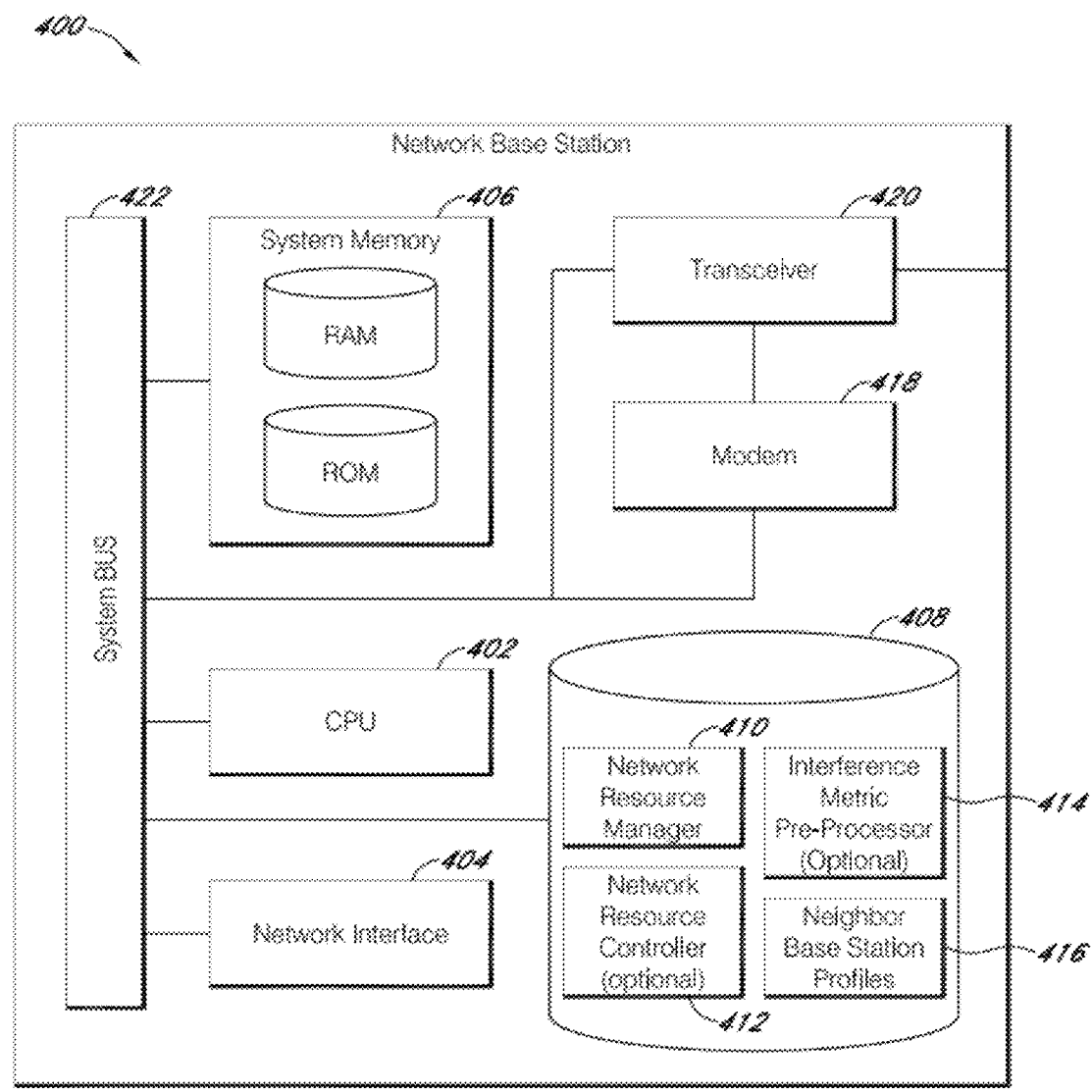
FIG. 4 illustrates a block diagram view of a network base station (or base) with an optional NRC in accordance with an embodiment of the invention where a NRC may be defined to be a software component of a base station.

FIG. 4 illustrates a block diagram view of a network base station 400 that could be representative of any of network base stations 106a-e, 204a, 206a, or 208a, depicted in FIG. 1 or 2. In accordance with an embodiment of the present invention, the network base station 400 may include, but is not limited to, one or more data processing devices including a central processing unit (CPU) 402. In an embodiment, the CPU 402 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 402 may be responsible for executing all computer programs stored on the network base station's 400 volatile (RAM) and non-volatile (ROM) system memories, 406 and 408.

The network base station 400 may also include, but is not limited to, a network interface component 404 that can facilitate the network base station's 400 communication with the backhaul 102 portion or the wireless portions of the network computing system 100 of FIG. 1; a modem 418 for modulating an analog carrier signal to encode digital information and for demodulating a carrier signal to decode digital information; a wireless transceiver component 420 for transmitting and receiving wireless communications to and from any of the wireless enabled computing devices (e.g., any of the network base stations 106a-e, or user equipment 108a-i, 116a-b, 118, and 120 of FIG. 1) of the networked computing system 100; a system bus 422 that facilitates data communications amongst all the hardware resources of the network base station 400; a software/database repository 408 including: a network resource manager component 410, an optional network resource controller 412, an—optional—interference metric preprocessor 414, and a repository of neighboring base station profiles 416.

In accordance with an embodiment of the present invention, the network resource manager component 410 may be configured to communicate with, and collaborate with, one or more service provider controller devices 110, 112, and 114, and/or neighboring base stations 106a-e to affect various network interference mitigation decisions (e.g., those associated with coordinated downlink power scheduling). In these embodiments, either the network base station 400, one or more neighboring network base stations (e.g., any of network base stations 106a-e), or any of the service provider controller devices 110, 112, and 114 may be acting independently or collectively as a NRC device, having NRC functionality (described further herein). In an embodiment, the base station 400 may have NRC functionality that is represented as a software component 412. In this embodiment, the NRC component 412 may include some or all of the components disclosed in the software/database repository 308 including: a network resource transmit power scheduler 312 that is capable of generating downlink power schedule(s) for one or more neighboring network base stations (e.g., any of network base stations 106a-e), a repository including readily-updatable interference rankings for neighboring network base stations 314 that include interference level data amongst neighboring network base stations (e.g., the intercell interference impact of neighbor base stations on communications facilitated by base station 400), and a repository of interference reduction histograms 316 that may include determined desired interference reduction CINR histograms and excess CINR data histograms.

The interference metric preprocessor 414 may be capable performing various interference mitigation processes associated with a NRC 300, in an embodiment where the NRC 300 is a separate entity. In this respect, the base station 400 may be capable of performing a portion of the data processing (e.g., after receiving measurement data from its served user equipment, including: measured carrier power from the serving base station 400, noise power, interference powers from neighboring base stations, calculated CINR, etc.) in order to reduce the amount of data flowing between the base station and the NRC 300. For example the interference metric preprocessor 414 may generate histograms associated with desired interference reductions based on received CINR data (e.g., measured/determined interference metric data from its serviced user equipment). This front end processing generally results in less data needing to be sent to a central NRC 300, when the NRC 300 is a separate entity from the base station 400. In this embodiment, communications bandwidth and centralized NRC 300 processing resources can be conserved by distributing certain tasks to capable network base station 400 resources. In an embodiment, the NRC 300 may require the network base station 400 to provide it with any new or updated information relating to its own available resources, communications quality states, or the current interference levels caused by neighboring network base stations. Alternatively, the network base station 400 may autonomously provide the NRC 300 with any new or updated information it detects or determines on a periodic basis.

In an embodiment, the network base station 400 may use any common modulation/encoding scheme known in the art, including, but not limited to: Binary Phase Shift Keying, Quadrature Phase Shift Keying, and Quadrature Amplitude Modulation. Additionally, the network base station 400 may be configured to communicate with the user equipment (e.g., any of devices 108a-e, 116a-b, 118, and 120) via any Cellular Data Communications Protocol, including any common LTE, GSM, UMTS, or WiMAX protocol.

Figure 5:
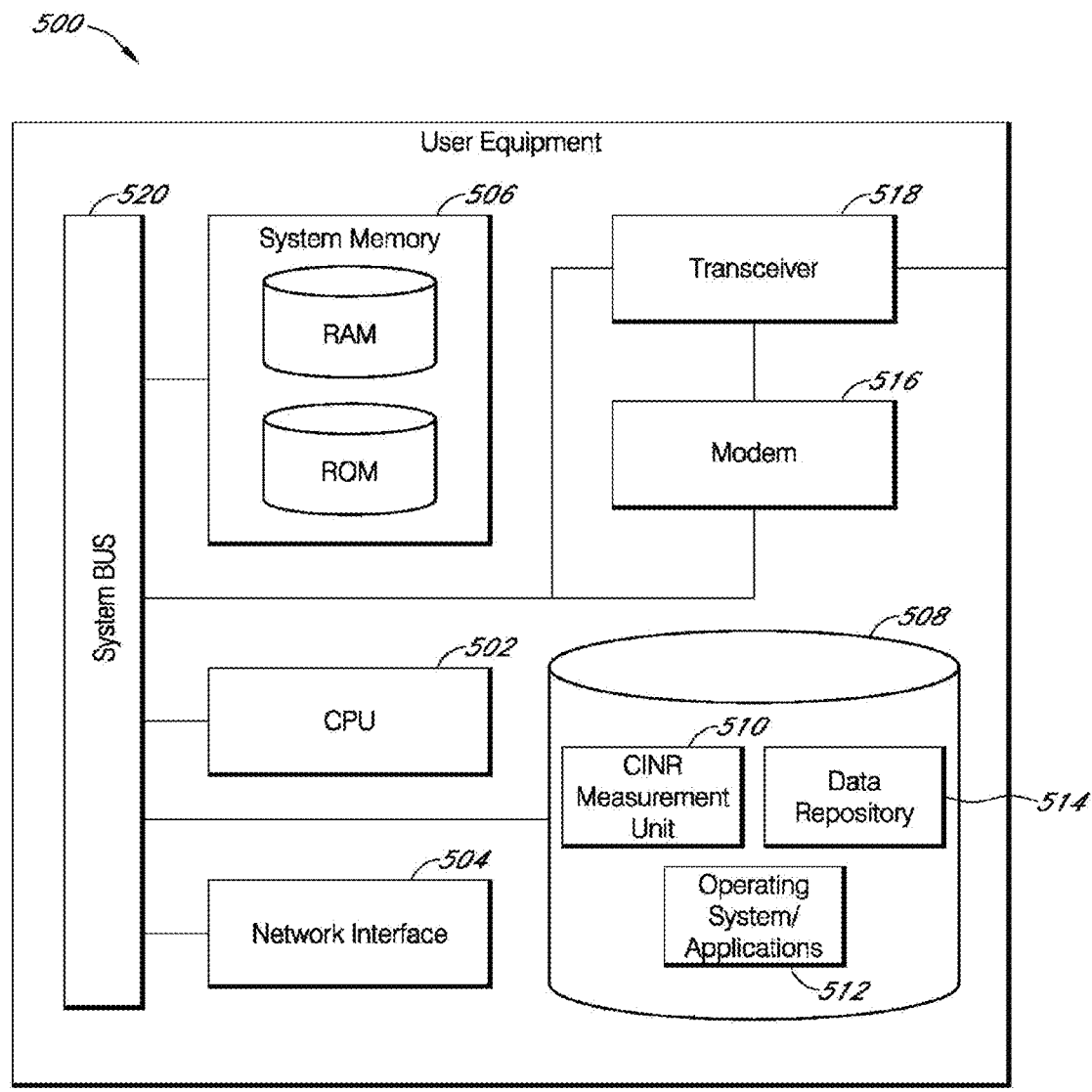
FIG. 5 illustrates a block diagram view of a user equipment (UE) in accordance with an embodiment of the invention.

FIG. 5 illustrates a block diagram view of a user equipment (UE) 500 that could be representative of any of user equipment 108a-i, 116a-b, 118, 120, 210a-e, 212a-e, 214a-c, or 216a-b, depicted in either FIG. 1 or 2. In accordance with an embodiment of the present invention, the user equipment 500 may include, but is not limited to, one or more data processing devices including a central processing unit (CPU) 502. In an embodiment, the CPU 502 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 502 may be responsible for executing all computer programs stored on the user equipment's 500 volatile (RAM) and non-volatile (ROM) system memories, 506 and 508.

The user equipment 500 may also include, but is not limited to, a network interface component 504 that can facilitate the user equipment's 500 communication with is locally connected computing devices (e.g., a Personal Computer); a modem 516 for modulating an analog carrier signal to encode digital information and for demodulating a carrier signal to decode digital information; a wireless transceiver component 518 for transmitting and receiving wireless communications to and from any of the wireless enabled computing devices (e.g., any of the network base stations 106a-e of FIG. 1) of the networked computing system 100; a system bus 520 that facilitates data communications amongst all the hardware resources of the user equipment 500; a software/database repository 508 including: a CINR measurement unit 510, an operating system/applications repository 512, and a data repository 514 storing various user equipment data.

In an embodiment, the CINR measurement unit 510 is capable a measuring various communications information associated with interference metric data, such as carrier power from a serving base station, noise power, interference powers from neighboring base stations, etc. Further, the CINR measurement unit 510 is also capable of calculating CINR data based on the measured interference metric data cited above. The measured interference metric data and the calculated CINR data may be collectively referred to herein as either "CINR measurement data" and/or "interference metric data." In various embodiments, CINR calculations, based on interference metric measurements, may alternately occur at a network base station 400 or a NRC 300, without departing from the spirit and scope of the present invention. The CINR measurement unit 510 may be capable of measuring both aggregate CINR (ratio of the carrier power to the sum of the interference powers from all interfering base stations) and the individual interfering base station CINR (ratio of the carrier power to the interference power of a single base station). The data repository 514 may be utilized by the user equipment 500 to store various interference metric data (including determined CINR data). In an embodiment, this data may be periodically transmitted to a NRC entity or a base station having NRC functionality. Alternately, the NRC may periodically request and acquire the interference metric data from the user equipment 500.

Figure 6:
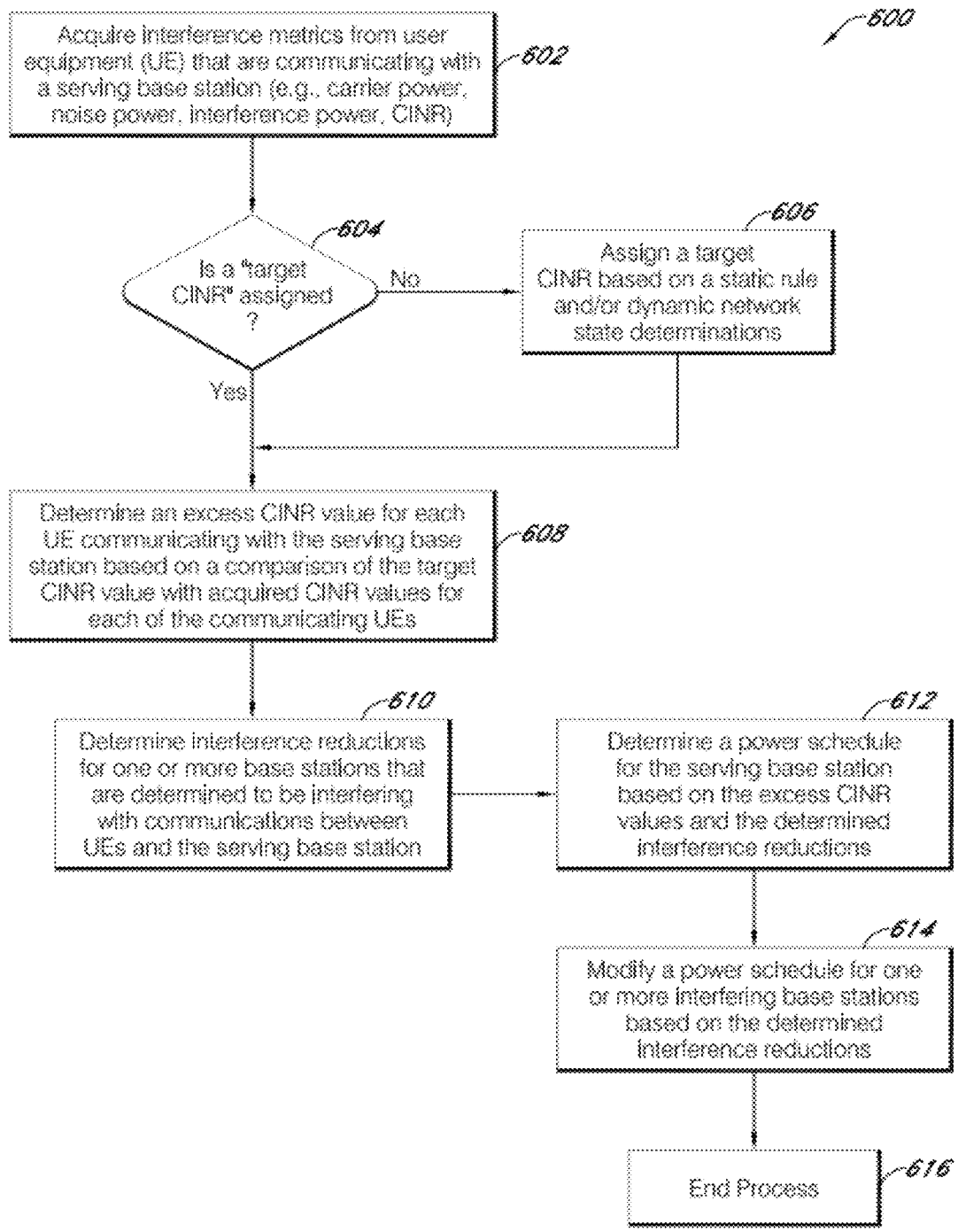
FIG. 6 illustrates a flow diagram depicting processes associated with intercell interference mitigation in accordance with an embodiment of the invention.

FIG. 6 illustrates a flow diagram depicting processes associated with intercell interference mitigation in accordance with an embodiment of the invention. It should be understood that these processes 600 may be executed independently or collectively using one or more computer-executable programs stored on one or more computer-readable media located on any of the network computing system's 100 base stations 106a-e, network controller devices 110, 112, and 114, or user equipment 108a-i, 116a-b, 118, and 120 of FIG. 1. At block 602, interference metrics are acquired (e.g., at a NRC which may be associated with any of base stations 106a-e or 400, or network controller devices 110, 112, and 114) from user equipment 108a-i, 116a-b, 118, and 120, or 500 that are in communication with a serving base station 400. These interference metrics may be associated with carrier power, noise power, interference power, CINR, etc. Then at decision block 604 it is determined if a target CINR value is already assigned. If a target CINR value is NOT already assigned, then at block 606, a NRC entity assigns a target CINR value based on a static rule and/or on dynamic network state determinations. However, if a target CINR value was already assigned or after one is assigned at block 606, the process proceeds to block 608, where an excess CINR value is determined for each UE communicating with its serving base station. This excess CINR determination is based on a comparison of the target CINR value with acquired CINR values for each of the communicating UEs. Next at block 610, interference reductions are determined for one or more base stations that are determined to be interfering with communications between UEs and their respective serving base station. Then at block 612, a power schedule for the serving base station is determined based on the excess CINR values and the determined interference reductions. Next, at block 614, the power schedule(s) for one or more interfering base stations is modified based on the determined interference reductions. Subsequently the process ends at block 616.

Figure 7:
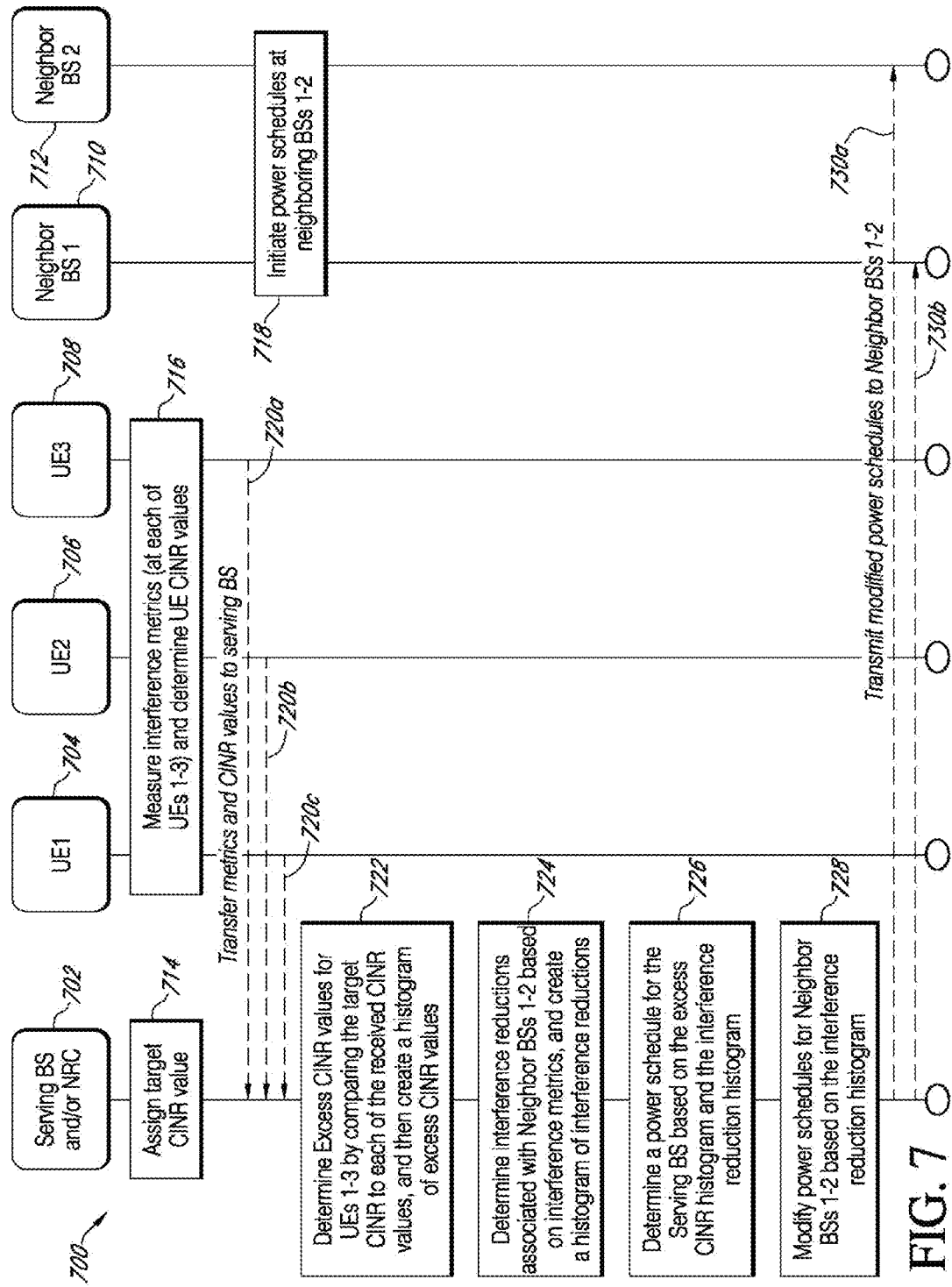
FIG. 7 illustrates a system flow diagram depicting intercell interference level determinations and associated power scheduling for neighboring network base stations to reduce intercell interference, in accordance with an embodiment of the invention.

FIG. 7 illustrates a system flow diagram depicting intercell interference level determinations and associated power scheduling for neighboring network base stations 702, 710 and 712 to reduce intercell interference, in accordance with an embodiment of the invention. It should be understood that these processes 700 could be executed using one or more computer executable programs stored on one or more computer-readable media located on any of the network computing system's 100 base stations 106a-e, network controller devices 110, 112, and 114, or user equipment 108a-i, 116a-b, 118, and 120 of FIG. 1. In an embodiment, the system flow diagram 700 depicts data communications interactions amongst at least the following devices: a serving base station (BS) and/or NRC 702 (e.g., represented by any of controller devices 110, 112, 114, and 300, or base stations 106a-e, 204a, 206a, 208a, and 400); a first user equipment (UE1) 704, a second user equipment (UE2) 706, a third user equipment (UE3) 708 (UEs1-3 may be represented by any of user equipment 108a-i, 116a-b, 118, 120, 210a-e, 212a-e, 214a-c, 216a-b, and 500), a first neighbor base station (NBS1) 710, and a second neighbor base station (NBS2) 712 (NBSs1-2 may be represented by any of base stations 106a-e, 204a, 206a, 208a, and 400).

At block 714, a target CINR (either based on a static rule and/or on dynamic network state determinations) is assigned at the serving BS and/or NRC entity 702 (alternately referred to herein as a "serving BS/NRC" entity). At block 716 each of UE1 704, UE2 706, and UE3 708, which may be distributed within the cell coverage area of and served by BS/NRC 702, measure various interference metrics that may be associated with: carrier power from the serving BS/NRC 702, noise power, interference powers from neighboring base stations NBSs1-2 710 and 712, etc. Using this measured information, each of UEs 1-3 may independently determine their respective CINR value. As would be understood by those skilled in the Art, UEs having relatively high CINR values are generally closer to their serving BS, and accordingly they may require lesser power transmission to establish a stable radio communications link, whereas UEs having relatively low CINR values are generally further from their serving BS, and accordingly they may require higher power transmission to establish a stable radio communications link After UEs 1-3 704, 706, and 708 measure their radio interference metrics and determine their CINR values, these metrics (including CINRs) are transmitted 720a-c to the serving BS/NRC 702 to facilitate subsequent intercell interference mitigation processes, which may include coordinated downlink power schedule determinations for neighboring network base stations BS/NRC 702, NBS1 710, and NBS2 712. At block 718, baseline power schedules are established for each of NBSs1-2 710 and 712. In an embodiment, these baseline power schedules may be established at the neighbor base stations NBSs1-2 710 and 712, or alternately at the serving base station and/or NRC 702. It should be understood that the sequential ordering of the processes carried out at blocks 714, 716, and 718 may be altered/reordered without departing from the spirit and scope of the present invention.

After the serving BS/NRC 702 receives the interference metrics (including CINR values) from its served UEs 704, 706, and 708, at block 722 it may determine excess CINR values for each of UEs1-3 704, 706, and 708, by comparing the assigned target CINR value to each of the received UE CINR values 720*a-c*. The BS/NRC 702 may then generate a histogram of excess CINR values based on those comparative determinations. At block 724 the BS/NRC 702 may determine the interference reductions associated with NBSs1-2 710 and 712 based on the received interference metrics (including CINR values), and then generate a histogram of interference reductions. Then at block 726, the BS/NRC 702 may determine a power schedule for the serving BS 702 based on the determined excess CINR histogram and the determined interference reduction histogram. Further, at block 728, the BS/NRC 702 may determine to modify power schedules for one or both of NBSs 1-2 based on the determined interference reduction histogram. It should be understood that the ordering of blocks 722-726 may be altered without departing from the spirit and scoped of the present invention. Further, it should be understood that the processes performed by the serving BS/NRC may occur at one network device (e.g., at a network base station 400—optionally having NRC functionality—or at a NRC entity 300), or the processes may be distributed amongst multiple network devices (e.g., at both a network base station 400—optionally having NRC functionality—and at a NRC entity 300, in collaborative communications with each other) without departing from the spirit and scope of the present invention, as discussed supra. After the power schedules for NBSs1-2 710 and 712 have been modified they may be transmitted 730*a-b* from the serving BS/NRC 702 to each of the NBS1 710 and NBS2 712, such that the modified power schedules can be employed to reduce intercell interference amongst the network base stations 702, 710, and 712, and network throughput can be improved amongst adjoining cells.

Figure 8:
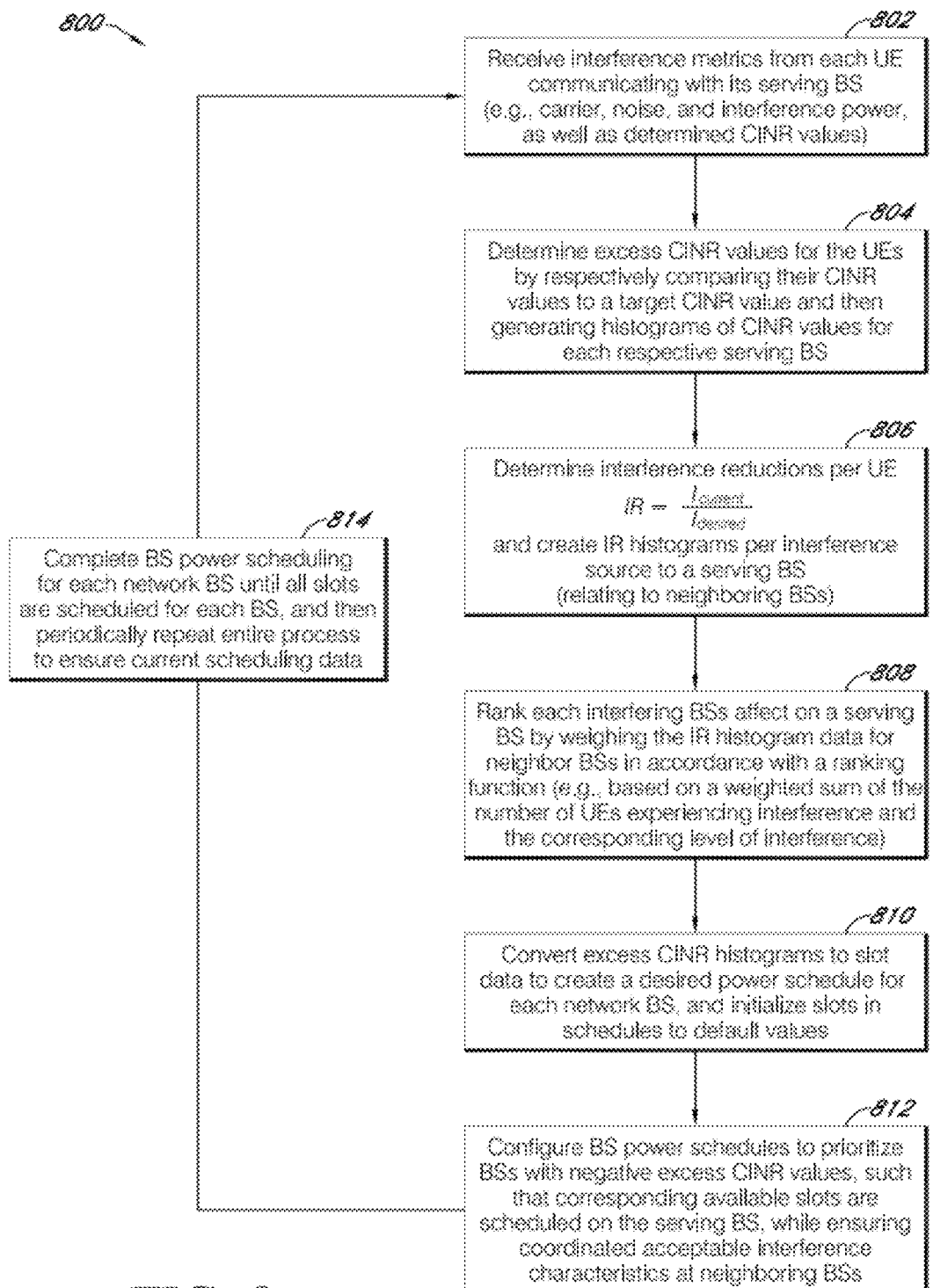
FIG. 8 illustrates a flow diagram depicting processes associated with intercell interference mitigation that includes neighbor base station interference ranking and coordinated power scheduling in accordance with an embodiment of the invention.

FIG. 8 illustrates a flow diagram depicting processes 800 associated with intercell interference mitigation that includes neighbor base station interference ranking and coordinated power scheduling in accordance with an embodiment of the invention. It should be understood that these processes 800 may be executed independently or collectively using one or more computer-executable programs stored on one or more computer-readable media located on any of the network computing system's 100 base stations 106*a-e*, network controller devices 110, 112, and 114, or user equipment 108*a-i*, 116*a-b*, 118, and 120 of FIG. 1. At block 802, interference metrics (e.g., carrier, noise, and interference powers, as well as determined CINR values) are received at a NRC entity (e.g., a network controller device 110, 112, 114 and 300 or a network base station 108*a-i* or 400). The interference metrics can be from each UE (e.g., any of user equipment 108*a-i*, 116*a-b*, 118, and 120 and 500) communicating with its serving base station (e.g., any of base stations 108*a-i*) or an aggregate representation of the interference metrics (e.g., a histogram of the metrics from each UE). Then at block 804, excess CINR values for the UEs are determined by comparing their CINR values to a target CINR value; using the excess CINR data, histograms of CINR values are generated for each respective serving base station (neighboring base stations). Interference reductions per UE are determined at block 806, and interference reduction histograms are then generated per interference source to a serving base station (e.g., relating to neighbor base station intercell interference impact to a particular serving base station). Then at block 808, each interfering base station is ranked, indicating its relative effect on the user equipment served by a particular serving base station. This is achieved by weighting the interference reduction histogram data for neighbor base stations in accordance with a specialized ranking function (e.g., a ranking function that is based on a weighted sum of the number of UEs experiencing interference and the corresponding level of interference). Next at block 810 excess CINR histograms are converted to slot data to create a desired power schedule for each neighboring network base station; slots in the power schedule are initialized to default values. At block 812, base station power schedules are configured to prioritize base stations with negative excess CINR values, such that corresponding available slots are scheduled on the serving base station, while ensuring coordinated acceptable interference characteristics at neighboring base stations. Subsequently, at block 814, base station power scheduling is completed for each network base station until all slots are scheduled for each base stations power schedule. Periodically, the entire process 800 is repeated to ensure current scheduling data exists to mitigate intercell interference in real time.

In support the disclosed intercell interference mitigation processes associated with the present invention, simulation data and results are described further herein to depict important concepts and procedures affiliated with embodiments of the invention, including network communications state determinations (e.g., interference metric determinations), network resource monitoring, neighboring cell negotiations/rankings, and intercell power scheduling processes. By employing interference mitigation solutions associated with the present invention, network performance can be improved by selectively scheduling low-power/high CINR transmissions for one base station, while simultaneously and collaboratively scheduling high-power/lower CINR transmissions at neighboring base stations on the same time and frequency resources. In addition to network resource and capacity improvements, cell coverage improvement may be achieved due to reduced levels of intercell interference.

In accordance with embodiments of the invention, there are multiple fundamental concepts and assumptions that solutions described herein are based on, including, but not limited to the following:

1. Time/spectrum resources can be split into a number of non-overlapping slots.
2. The transmit power in each slot can be adjusted in each network base station to collaboratively improve CINR values amongst neighboring cells.
3. Scheduling and synchronization across cells is crucial to achieve the multitude of benefits associated with the solutions of the present invention.

In an embodiment, each user equipment 500 serviced by a network base station 400 may be capable of independently measuring/determining various interference metrics associated with: carrier power from a serving base station, noise power, interference powers from neighboring base stations, CINR, etc. Further, these user equipment (e.g., any of user equipment 108*a-i*, 116*a-b*, 118, and 120 of FIG. 1.) may report these metrics to its serving base station (e.g., any of base stations 106*a-e*), periodically or upon request. The metrics may be consolidated to facilitate further interference mitigation processing. In one embodiment, carrier and interference power measurements may be made when the network base stations are transmitting at a predefined level(s), such as 0 dB backoff. This may be achieved either via measuring a control channel's power, or by measuring a data channel whose power backoff is known. In an embodiment, it should be understood that a target CINR may be generally defined as a desired (from the perspective of a particular service provider) CINR experienced at each user equipment serviced by a network base station. In an embodiment the number of slots associated with a power schedule may be defined as the number of non-overlapping time/spectrum resources that can be independently controlled in power.

In accordance with an initialization process, any logical array of base stations (e.g., representing any of base stations 106a-e, 204a, 206a, 208a and 400) may be created having properties including: definition of position, antenna, transmit power, frequency, etc. For simplicity of explanation, a base station may be considered to provide service on a single RF carrier. Further, several co-located "base stations" are needed to compose a multi-sector base station with three, four, or possibly more sectors. An array of serviced user equipment (e.g., represented by any of user equipment 108a-i, 116a-b, 118, 120, 210a-e, 212a-e, 214a-c, and 216a-b) may be created, and each UE may be associated with a particular base station, in accordance with a maximum signal strength. A power schedule for each base station in the array may be initialized, such that each slot is set to a default power backoff (e.g., a 0 dB power backoff). In general, a power schedule may be defined as an array of a number of slot power levels. Each base station may have its own power schedule and it can assign each user equipment it services into one of the scheduled slots in accordance with the interference mitigation power scheduling processes discussed further herein. Raw interference metrics (e.g., carrier power from a serving base station, noise power, interference powers from neighboring base stations, etc.) may be measured for each user equipment serviced by a network base station.

Subsequent to interference metrics being collected, CINR values may be determined (e.g., by the UE, a base station, a NRC, etc.) and the interference metrics may be transmitted to serving network base stations (e.g., any of base stations 106a-e, 204a, 206a, 208a and 400) by the user equipment (e.g., any of user equipment 108a-i, 116a-b, 118, 120, 210a-e, 212a-e, 214a-c, and 216a-b). In accordance with various optimization processes excess CINR may then be calculated for each user equipment. This data may then be compiled into excess CINR histograms (e.g., one histogram per base station where the data in the histograms is the excess CINR for each of the UEs served by a particular base station). In an embodiment, excess CINR may be defined as the amount that the measured CINR exceeds (or falls short of) a target CINR ratio. By way of example, if the target CINR is determined to be 20 dB, and the measured/calculated CINR for a user equipment is 30 dB, then the excess CINR is: +10 dB. Further, if the target CINR is 20 dB, and the measured CINR is 10 dB, then the excess CINR is: −10 dB. For a given base station, the excess CINR from each served user equipment may be used to generate a histogram of excess CINR data. It should be understood that an excess CINR value may be a positive or a negative value. In an embodiment, the excess CINR histogram may have bin centers located at: −20, −15, −10, −5, 0, 5, 10, 15, and 20 dB CINR.

In an embodiment, excess CINR histograms may subsequently be converted from counts of user equipment to counts of slots to create a desired power schedule for a particular network base station. In an embodiment, a slot is a group of airlink time or frequency resources on which data can be transmitted at a particular power level by each base station. As would be understood by those skilled in the Art, co-channel interference may occur when a serving base station transmits data to a UE in the same slot (i.e. at the same time and on the same frequency) that an interfering base station is transmitting. By way of example, the following data conversion depicts how the values in the excess CINR histograms may be converted into slot counts:

Excess CINR UE counts: [(−20: 21) (−15: 87) (−10: 203) (−5: 393) (0: 315) (+5: 205) (+10: 173) (+15: 67) (+20: 0)]

Each pair of values shown in parentheses relate to histogram bin center values (excess CINR in this case) and the number of entries in the corresponding bin. The excess CINR counts histogram has a first value: 21 that is the number of user equipment needing a 20 dB improvement in CINR; the second value: 87 is the number of user equipment that need a 15 dB improvement in CINR, etc. If the total number of user equipment is 1464, and if the number of slots is 10, normalization could be achieved by dividing by 146.4 (=1464/10). After conversion, the array counts number of slots, and the results are:

Normalized excess CINR counts: [(−20: 0.14) (−15: 0.59) (−10: 1.39) (−5: 2.68) (0: 2.15) (+5: 1.40) (+10: 1.18) (+15: 0.46) (+20: 0)]

In an embodiment, it may be desirable to determine a transmit power for complete slots as opposed to determining a transmit power for partial slots, so the above normalized array can be converted to an excess CINR slot histogram, with each bin containing an integer number of slots. The first bin, second bin, and part of the third bin of the normalized excess CINR counts histogram may fit into one slot (i.e., 0.14+0.59+ 0.27 from the third bin=1.0). Therefore the first bin of the excess CINR slot histogram may be allocated one slot to take these. Similarly, the other slots may be allocated to fill the bins for a particular base station as follows:

Excess CINR slots: [(−20: 1) (−15: 0) (−10: 2) (−5: 2) (0: 2) (+5: 2) (+10: 1) (+15: 0) (+20: 0)]

By way of example, one slot of data ideally needs a 20 dB CINR improvement to reach the target CINR, zero slots need a 15 dB CINR improvement, two slots need a 10 dB CINR improvement, and two slots need a 5 dB improvement, etc. At the high end of the array, there are zero slots available that can have a 20 dB excess in CINR, zero at 15 dB, one at 10 dB, and two slots that have a 5 dB CINR excess. Finally, the middle value in the array shows that there are two slots that have neither a CINR deficiency nor excess.

In an embodiment, a desired interference reduction for each user equipment/interfering base station pair may also be calculated and placed into an interference reduction or IR histogram. A desired interference reduction may be calculated as the ratio between a current interference level and a desired interference level. This ratio is calculated per interference source (e.g., per interfering neighboring base station). Multiple desired interference reductions may be calculated for each user equipment, depending on how many interfering base stations affect the user equipments communications with its serving base station. Desired interference reductions may be calculated for all interfering base stations, or only for the strongest N interfering base stations, where N is a small positive integer (e.g., 3 or 4).

In an embodiment, a desired interference reduction (e.g., an interference from base station X) may be calculated as the minimum of: the interference power reduction that yields a noise to interference ratio of the pre-defined target $N/I_X$ ratio (3 dB), and the interference power reduction that yields an interference to carrier power of the pre-defined target $C/I_X$ ratio (20 dB). By way of Example, the following scenarios depict various interference power reductions in accordance with embodiments of the present invention:

Scenario 1:
Target C/I=20 dB
Carrier power=−90 dBm
Interference power from base station X=−95 dBm
Interference power from base station Y=−100 dBm
Noise power=−100 dBm The desired interference reduction for base station X is +8 dB (to bring the interference power to 3 dB below the noise power). The desired interference reduction for base station Y is +3 dB (to bring the interference power to 3 dB below the noise power).

Scenario 2:
Target C/I=20 dB
Carrier power=−60 dBm
Interference power from base station S=−65 dBm
Interference power from base station T=−100 dBm
Interference power from base station U=−85 dBm
Noise power=−100 dBm The desired interference reduction for base station S is +15 dB (to bring the interference power to 20 dB below the carrier power). The desired interference reduction for base station T is −20 dB (to bring the interference power to 20 dB below the carrier power). The desired interference reduction for base station U is −5 dB (to bring the interference power to 20 dB below the carrier power).

For a given base station station, the desired interference reductions from each served mobile may be used to create histograms, one histogram per interfering base station (in the scenarios, base stations X, Y, S, T, and U).

In an embodiment, a histogram with bin centers at 0, 5, 10, 15, and 20 dB may be used to count the number of mobiles served by the serving base station that desire a particular interference reduction level from an interfering base station. In an embodiment, if the desired interference reduction is less than 0 (no improvement necessary) the data is not counted in the histogram. This helps to minimize the number of desired interference reduction histograms per serving base station, depending on network topology. The binning of UE counts in the histogram can be done by choosing the bin closet in value to the actual desired interference reduction, or the bin greater than or equal to the desired interference reduction, or the bin less than or equal to the desired interference reduction.

By using the IR histograms, the interfering neighbor base stations can be ranked according to their impact on a particular serving cell's communications, and the data for base stations with insignificant levels of interference may be discarded. In an embodiment, only a certain number of the top ranked interfering base stations may be considered for interference reduction. For example, base station A could have the interference data represented in Table 1 below. In this example, 19 of the UEs being served by base station A desire no interference reduction from base station B, 24 of the UEs being served by base station A desire 5 dB interference reduction from base station B, etc.

TABLE 1

| IR for Interfering BSs | 0 dB | 5 dB | 10 dB | 15 dB | 20 dB |
|---|---|---|---|---|---|
| Base B | 19 | 24 | 8 | 0 | 0 |
| Base C | 29 | 61 | 64 | 9 | 0 |
| Base D | 75 | 79 | 90 | 0 | 0 |
| Base E | 5 | 0 | 0 | 0 | 0 |

In an embodiment, a specialized ranking function may be utilized to weigh the overall impact of neighboring interfering base stations (e.g., any of base stations B, C, D, and E) on the UEs served by a particular base station (e.g., base station A). In effect, the IR histogram data for neighbor base stations can be analyzed with a specialized ranking function, which may be based on a weighted sum of the number of user equipment experiencing interference and the corresponding level of interference experienced. The employed ranking function can effectively allow a NRC entity 300 to prioritize which interfering neighbor base stations should have their power schedules modified and which neighboring base stations can be ignored in coordinated scheduling tasks. The goal of employing a ranking function is to target the base stations that have the greatest impact on reducing intercell interference, while minimally impacting network overhead. By choosing which base stations pose the greatest interference problems, lesser interfering base stations do not need to unnecessarily have their power schedules adjusted to accommodate a neighbor. This additionally limits the processing impact of the interference mitigation solutions on the network, such that fewer resources are wasted while system throughput and performance are optimized.

By way of example, the following ranking function may be employed in accordance with an embodiment of the present invention:

$$BS\ Ranking = \frac{100}{Total\ UEs\ for\ BS} \sum_{i=0}^{numInterfLevels-1} 5^i \times \text{Desired Interference Reduction}[i]$$

In the above equation, numInterfLevels refers to the number of desired interference reduction levels. The index i corresponds to a desired interference reduction level. Using the data in Table 1 for example, numInterfLevels would be 5; DesiredInterferenceReduction[0] would refer to the number of UEs desiring an interference reduction of 0 dB; DesiredInterferenceReduction[1] would refer to the number of UEs desiring an interference reduction of 5 dB, etc. The weighting factor of 5 in the above equation may be chosen by trial and error or some other iterative method. The weighting factor constant may be utilized to increase weighting associated with more strongly interfered mobile user equipment. In various other embodiments, different weighting factors can also be utilized without detrimentally impacting the performance of the methods associated with the present invention. In the above scenario, associated with Table 1, assume that Base A serves 1464 mobiles, then the rankings for the four interfering base stations (Bases B, C, D and E) may be 23, 209, 186, and 0.3, respectively. These rankings indicate that Base E is not causing a lot of interference towards the user equipment being served by Base A and that it can be ignored due to its minimal interference impact to Base A. Base B is causing some interference, but nowhere as much as Bases C and D. Accordingly, for subsequent interference reduction processes, the focus would be on reducing the interference impact of Bases C and D.

In an embodiment, a power schedule for each base station is determined. Power scheduling is the process of assigning a transmit power to each slot for each base station. A power schedule is the schedule of transmit powers assigned to each slot. Coordinated power scheduling attempts to coordinate the choice of transmit powers for slots on adjacent base stations in an effort to reduce the overall levels of interference in the network and to increase the overall capacity and performance of the network. Initially the power schedule for each base station may be initialized to "no power allocated" for every slot, for example to assigning the data a special default value (e.g. 9999). The power schedules may further be adapted to particularly accommodate the user equipment with negative excess CINR (i.e., in this example, the mobiles represented by the first four columns in the Excess CINR slot array). In an embodiment, when a base station has a negative excess CINR slot to schedule, a slot that has not been allocated a transmit power on the serving base and has good power characteristics on the interfering bases may be selected to improve system performance. The choice of slot may be based upon: existing power schedules, ranking of interfering neighbor base stations, desired interference reduction, etc. In accordance with an embodiment of the invention, slot selection may be employed in accordance with the slot selection processes, discussed below. In an embodiment, a power schedule may then be set for both a serving base station and interfering neighbor base stations. These steps may be repeated for each base station until all slots have a power assigned to them.

In an embodiment, the process of power schedule adaptation is described in the following slot selection implementation. In accordance with the present invention, slot selection may be thought of as the process of finding an optimal location in the power schedules of all the neighboring base stations and allocating transmit powers for that slot to each base station. Slot selection may be based on at least the following factors: the ability to achieve the desired interference reduction, the ability to use an existing power schedule, and the preference to achieve power reduction for more highly interfering bases.

For a given serving base station, each interfering neighbor base station slot may yield some amount of power backoff, for example between 0 and 20 dB. This backoff can be determined by analyzing the interfering base station's power schedule and its Excess CINR slot array. If the power schedule indicates that the power is already determined for a given slot, then the power is set and cannot be changed. Otherwise, a power setting may be chosen from the non-zero entries in the Excess CINR slot array. Negative values (e.g., −20, −15, −10, and −5) indicate a power backoff of 0 dB, since these are slots that are deficient in signal quality. In accordance with an embodiment of the invention, the nearest backoff power may be defined as the closest available backoff that equals or exceeds the target backoff, or if none equal or larger exist, the closest available backoff that is smaller than the target backoff. The nearest backoff may be determined by analyzing the Excess CINR slot array of the interfering base station(s). In an embodiment utilizing the nearest backoff power, a backoff score may be calculated for each slot for interfering base stations. The backoff score may generally give a high score for slots in which power can be allocated in such a way as to achieve a match in achievable backoff; a lower score for slots in which power can be allocated in such a way as to achieve a positive backoff; and a score of zero for slots in which power cannot be allocated in such a way as to achieve any interference improvement.

An important feature associated with the present invention is the ability to choose slots on a serving base station that align with slots that have already been allocated a transmit power reduction in the power schedule of interfering base stations, because this functionality enables flexibility in power scheduling and it further reduces processing resource usage. For example, if base station X has been scheduled with a reduced transmit power on a slot 3, and if base station Z can use this knowledge and use slot 3 to improve CINR, then it is beneficial to use slot 3 rather than trying to schedule a different slot. On the other hand, if the serving base station has already scheduled slot 3, then it is unavailable, and a new slot will need to be scheduled with the desired transmit power. In general, scoring for a schedule may give a higher, prioritized value for an existing schedule.

In an embodiment, the power scheduling techniques associated with the present invention favor reducing the transmit power of more strongly interfering bases (e.g., those having more interference impact on a particular serving base station) and accordingly, a ranking system for interfering bases may be utilized. In an embodiment an overall rank for a particular slot may be determined by calculating the product of the scores summed over all the interfering base stations. An overall score may be calculated for each available slot, and the slot with the highest score can be selected, and the power schedule and Excess CINR arrays for both the serving base station and the interfering bases can be dynamically updated.

Figure 9:
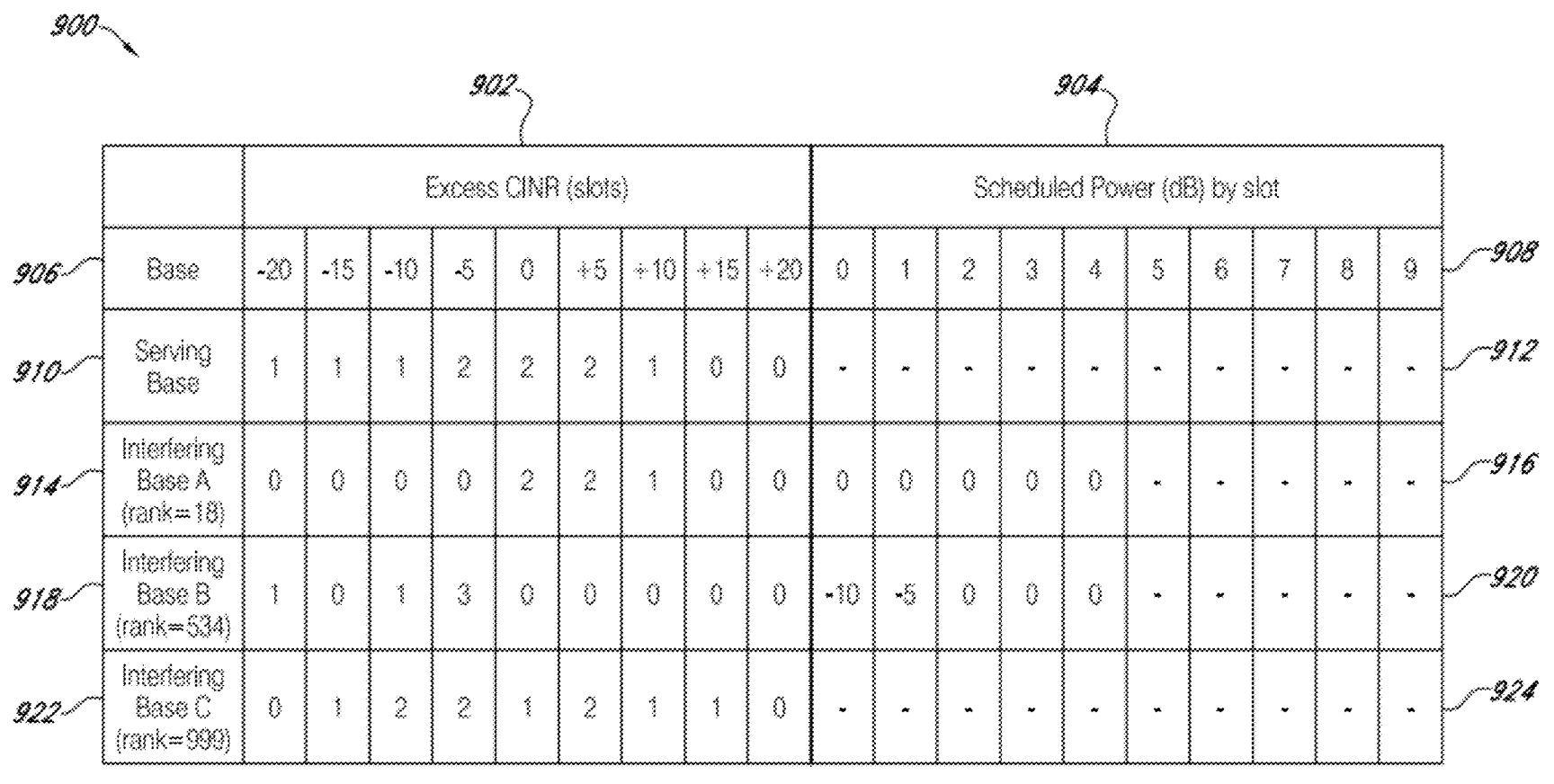

FIG. 9 illustrates an excess CINR table 900 and an associated power schedule for a serving base station and its strongest interfering neighbor base stations in accordance with an embodiment of the invention. The table includes Excess CINR slots 902 having predefined CINR levels 906, ranging between −20 dB and +20 dB, and power schedule slots 904 having predefined slots 908, ranging between 0 to 9. The counts in the Excess CINR slots indicate the number of slots that have the corresponding excess CINR. A negative excess CINR means that the CINR is below the target CINR level, while a positive excess CINR means that that CINR is above the target CINR level. The Excess CINR slots and the power schedule slots are defined for a serving base station 910 and 912 and for interfering neighbor base stations A-C 914, 916, 918, 920, 922, and 924. In the excess CINR table 900 power levels have already been assigned to the power schedule slots 904 0 to 4 for interfering base station A 916 and interfering base station B 920.

Figure 10:
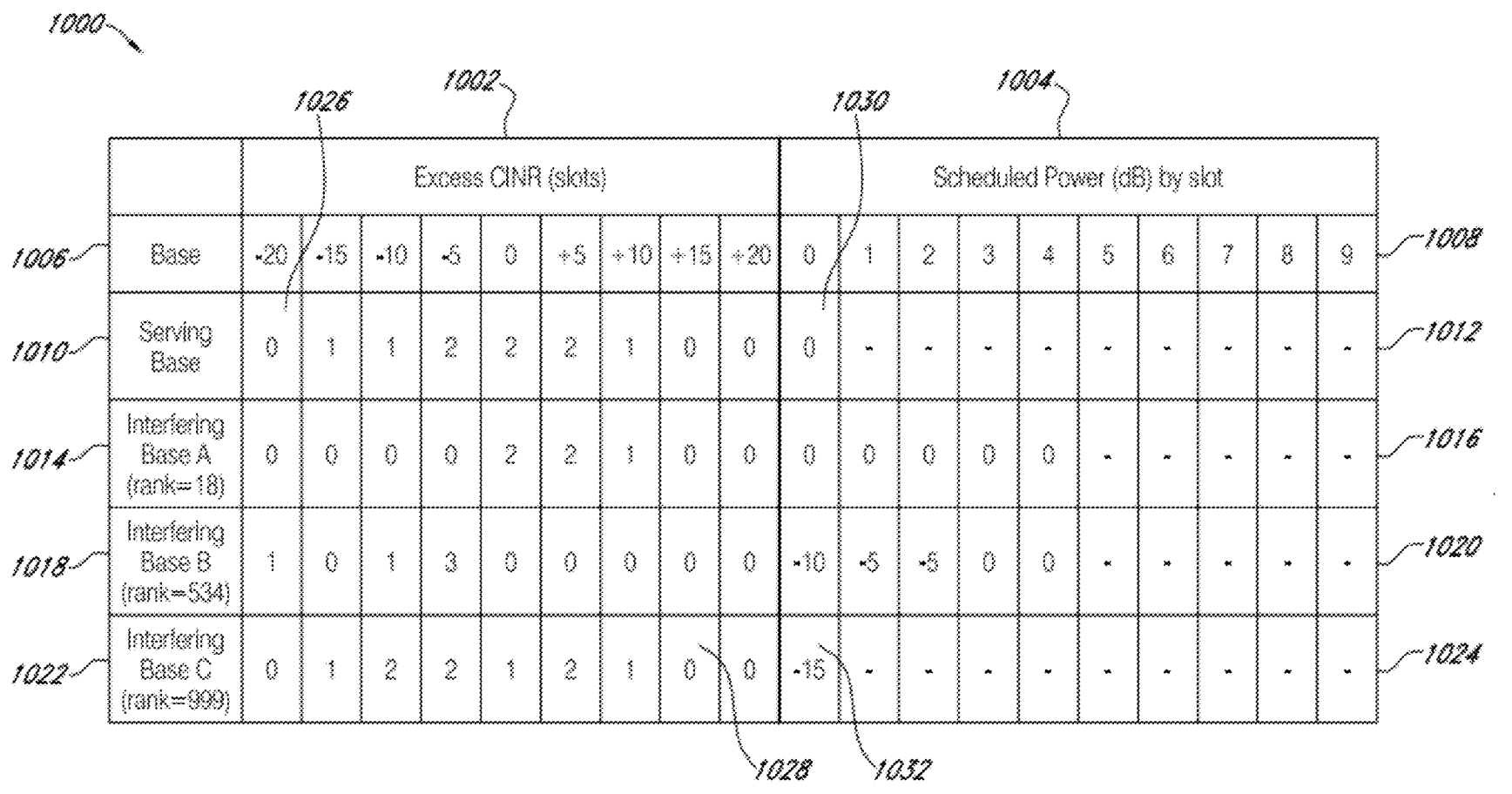

FIG. 10 illustrates an excess CINR table 1000 and an associated first power slot scheduling process for a serving base station and its strongest interfering neighbor base stations in accordance with an embodiment of the invention. It should be understood that references 1002, 1004, 1006, 1008, 1010, 1012, 1014, 1016, 1018, 1020, 1022, and 1024, correspond with reference numbers 902, 904, 906, 908, 910, 912, 914, 916, 918, 920, 922, and 924 of FIG. 9. In an embodiment a scheduling process starts with the table 900 in FIG. 9 and schedules the poorest excess CINR for the serving base station 910, 1010. The poorest excess CINR needing a 20 dB improvement for the serving base station is slot 1026. In this scheduling process previously unscheduled slot 0 1030 is scheduled for the serving base station. By way of example, it might be considered why slot 0 1030 was scheduled over other slots, such as slot 5. Either slot 0 or slot 5 can achieve a +15 dB backoff from base station C by scheduling the +15 dB excess CINR slot 1028 (scheduled power=−15 dB) in scheduled power slot 0 or 5. Slot 5 could achieve a +10 dB backoff (scheduled power=−10 dB) from base station A, but only a 0 dB backoff from base station B because base station B has no remaining slots for which it can back off its transmit power. Accordingly, compared to slot 0 1030 base station A interference may be decreased, but base station B interference may be increased However, since the rank for base station B is determined to be significantly higher than for base station A, the selection of slot 5 is not as favorable solution as the selection of slot 0 1030. This emphasizes the practical benefit associated with the use of a ranking function. In slot 0 1030, a 10 dB backoff from base station B is achieved. As part of this scheduling process, the previously unscheduled slot that can be transmitted with a 15 dB 1028 power reduction for interfering base station C 1024 is scheduled in slot 0 1032.

Note that even though slot 1026 ideally requires an improvement of 20 dB to reach the target CINR level, this level of improvement is not always feasible. In this case, the best possible improvement was found to occur when slot 0 of the serving base station 1030 was scheduled with 0 dB backoff, corresponding to backoffs of 10 dB from interfering base stationB and 15 dB from interfering base station C.

FIG. 11 illustrates an excess CINR table and an associated additional power slot scheduling process for a serving base station and its strongest interfering neighbor base stations in accordance with an embodiment of the invention. It should be understood that references 1102, 1104, 1106, 1108, 1110, 1112, 1114, 1116, 1118, 1120, 1122, and 1124, correspond with reference numbers 1002, 1004, 1006, 1008, 1010, 1012, 1014, 1016, 1018, 1020, 1022, and 1024 of FIG. 10. In an embodiment a scheduling process proceeds to schedule the next poorest excess CINR for the serving base station 1110. There is one slot 1126 with the next poorest excess CINR, needing a 15 dB improvement for the serving base station. In this scheduling process previously unscheduled slot 1 for the serving base station 1130 is scheduled for the serving base station. The slot from interfering base station C with 15 dB excess CINR 1128 is scheduled in previously unscheduled slot 1 for base station C 1132.

Subsequently, the process continues to schedule by cycling through all the base stations (e.g., those having lower rankings: base station B 1118 and base station A 1114) until a schedule for the entire network has been completed. Alternatively, one slot per base station can be scheduled at a time, cycling through each base stations in turn. In an embodiment, there may be left over unscheduled slots, and these can be assigned in the power schedule in an ad-hoc manner.

Figure 12:
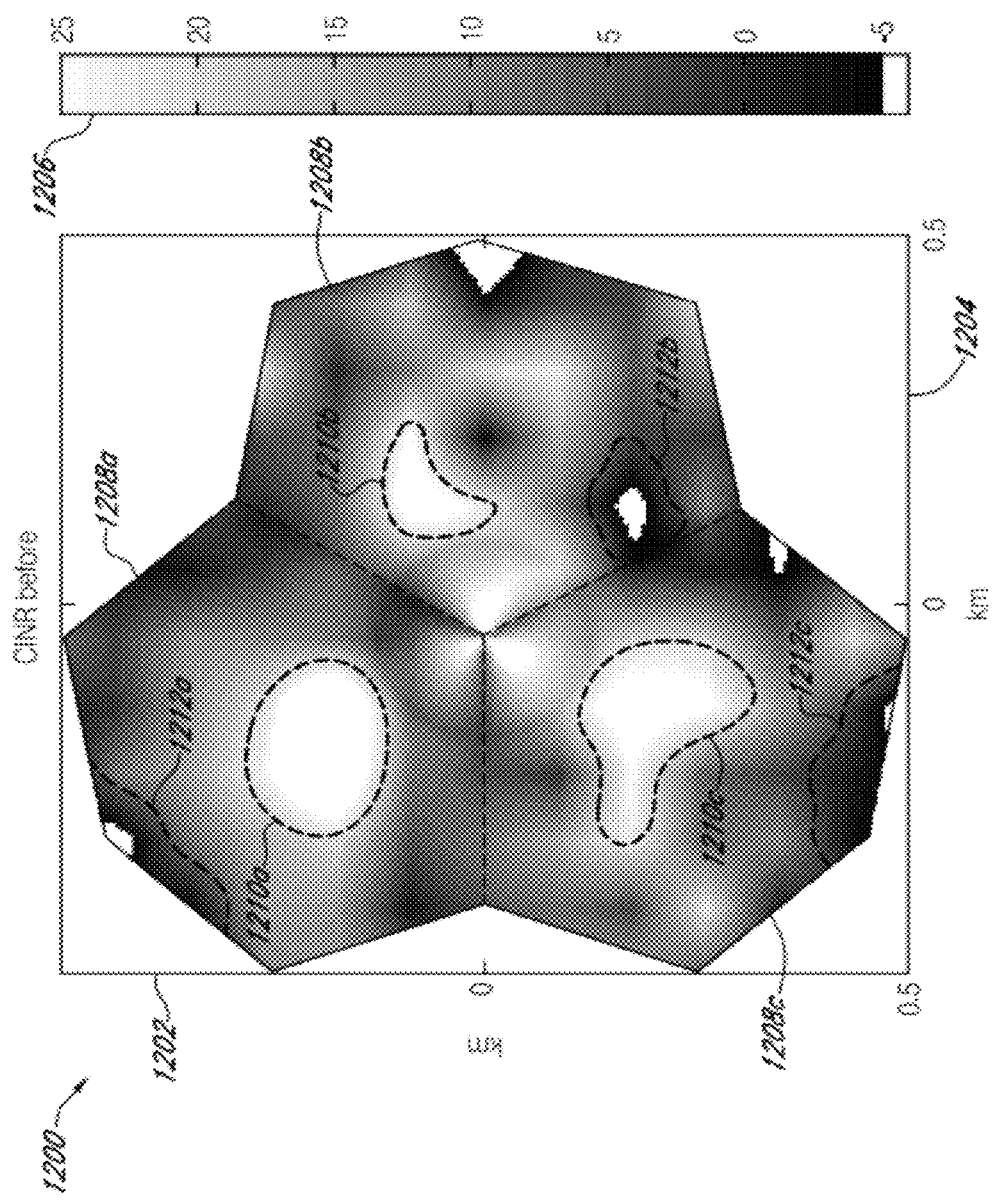
FIG. 12 illustrates a before CINR image plot using a gray scale to depict coverage area quality in accordance with an embodiment of the invention.

FIG. 12 illustrates a before CINR image plot 1200 using a gray scale 1206 to depict coverage area quality expressed in terms of CINR, in accordance with an embodiment of the invention. As can be seen in the before image plot (prior to coordinated scheduling that reduces intercell interference) there are three sectors 1208a-c having areas of either very low CINR 1212a-c (darker colored regions) and areas of very high CINR 1210a-c (lighter colored regions). The horizontal and vertical axes 1202 and 1204 define the coverage area and they are measured in a kilometer scale (having a 1 km. radius). The problems discussed in the background are evidenced in this image plot, because the periphery regions show very low CINR 1212a-c (darker colored regions) and this is commonly associated with the negative effects of intercell co-channel interference. Further the areas of high CINR 1210a-c (whiter colored regions) are likely significantly overpowered and network resources are not being fully utilized in regions 1210a-c.

Figure 13:
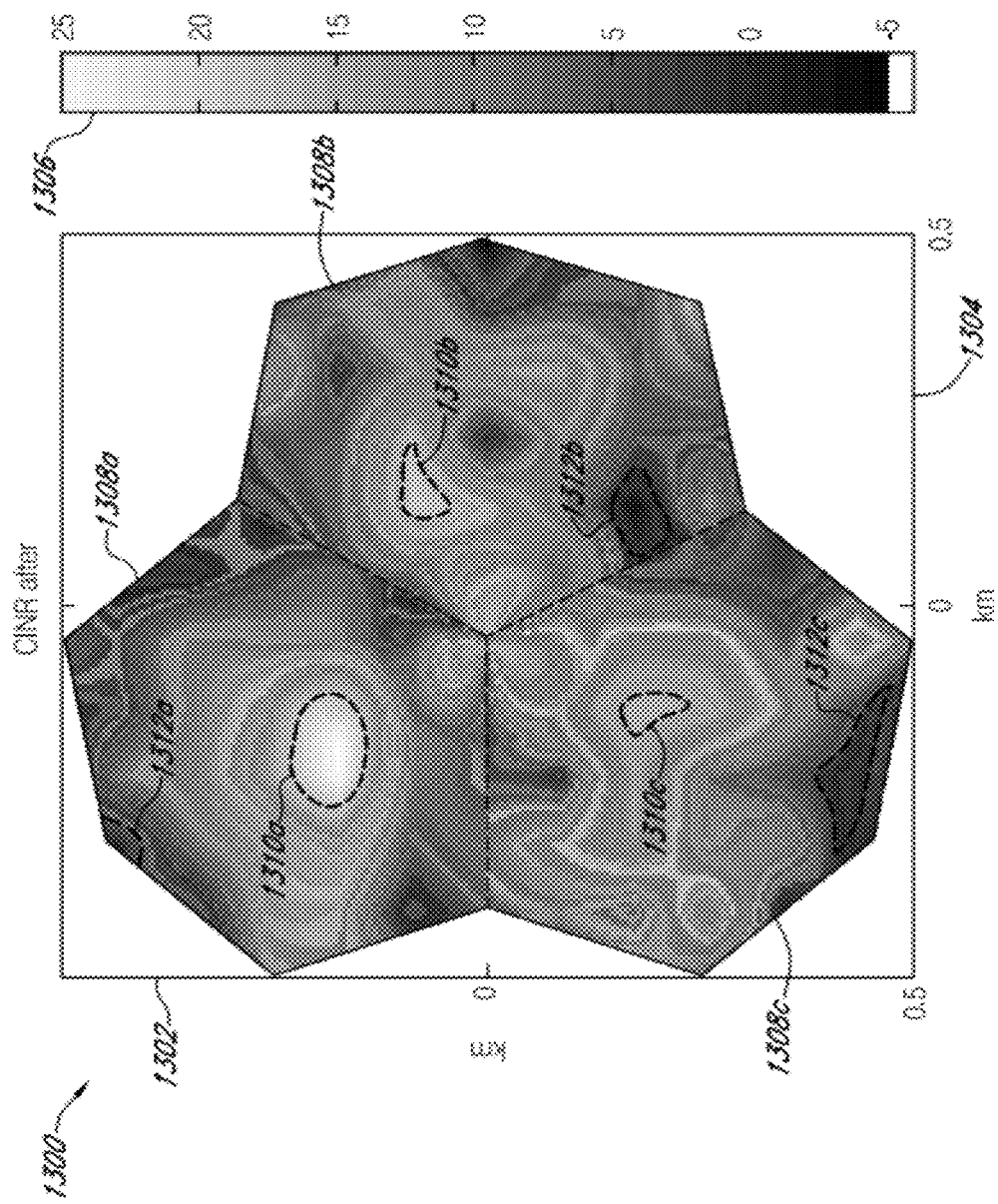
FIG. 13 illustrates an after CINR image plot using a gray scale to depict coverage area quality in accordance with an embodiment of the invention.

FIG. 13 illustrates an after CINR cumulative distribution function image plot 1300 using a gray scale 1306 to depict coverage area quality in accordance with an embodiment of the invention. As can be seen in the after image plot (employing coordinated scheduling that reduces intercell interference) there are three sectors 1308a-c having much smaller areas of either moderate to high CINR 1312a-c (darker colored regions) or areas of low CINR 1310a-c (lighter colored regions). The horizontal and vertical axes 1302 and 1304 define the coverage area and they are measured in a kilometer scale (having a 1 km. radius). The problems discussed in the background are no longer as pronounced and a substantial improvement is seen in comparison to the before image plot 1200, because the periphery regions show lighter and smaller low CINR 1312a-c regions (darker colored regions) when compared to regions 1212a-c of FIG. 12. This is associated with reduced effects of intercell co-channel interference caused by coordinated power scheduling. Further, the areas of high CINR 1310a-c (lighter colored regions) are smaller and darker in color indicating that power resource waste has been reduced when compared to the almost white, larger overpowered regions 1210a-c seen in the before image plot 1200. As would be understood by those skilled in the Art fewer network resources are being wasted in both regions 1310a-c and 1312a-c as compared with regions 1210a-c and 1212a-c. The number of user equipment experiencing both very high and very low CINR has been reduced. In effect, the excess CINR of some user equipment is given up to yield a better CINR to those users with previously poor coverage. The cumulative, net effect is improved network coverage and throughput. This is a direct result of intercell interference mitigation and scaled, weighted power scheduling. The benefits achieved by the solutions taught herein are both numerous, and significant across both small scale and large scale cellular network deployments.

Figure 14:
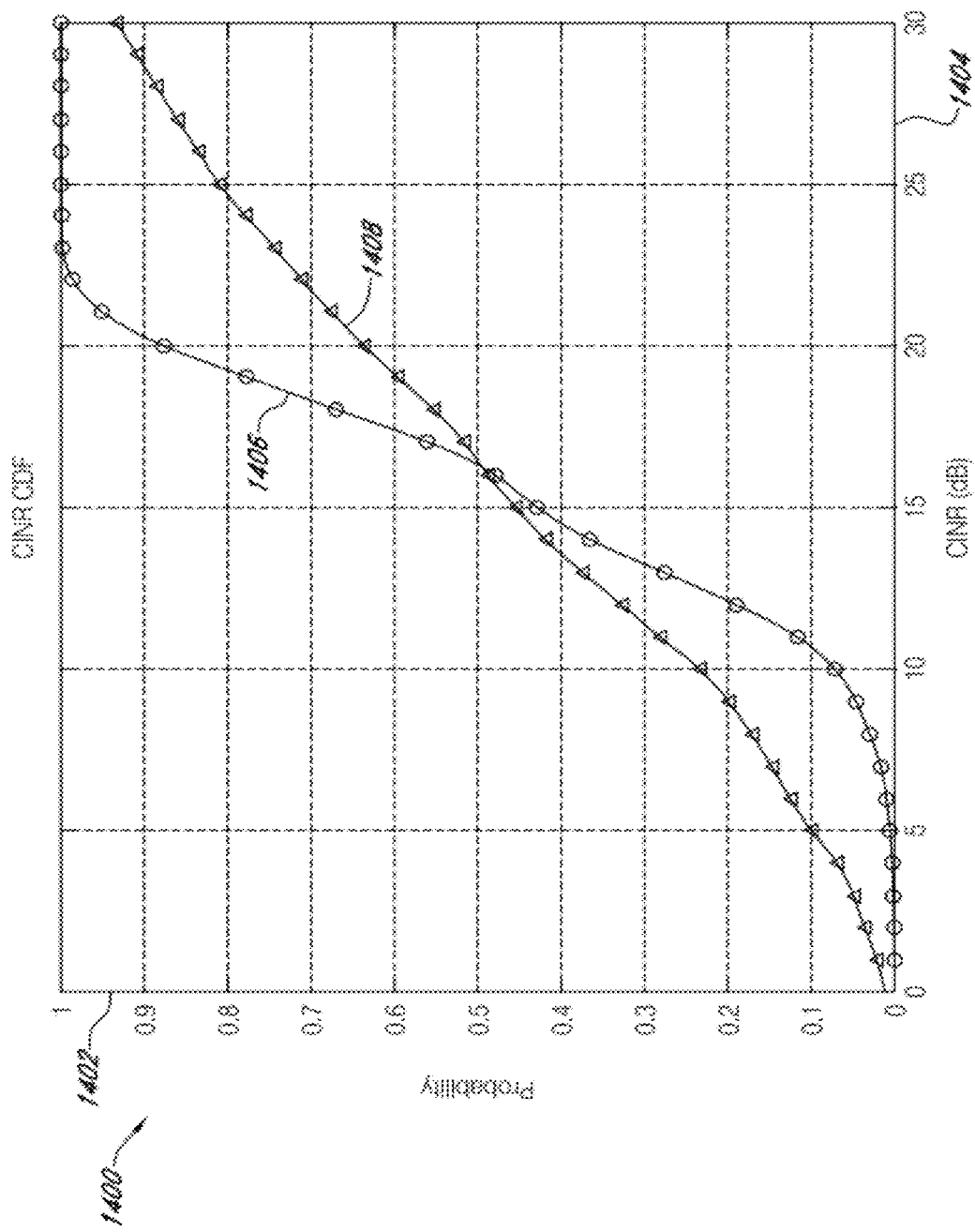
FIG. 14 illustrates a graph comparing before and after probability plots associated with CINR cumulative distribution function data for user equipment communicating within a portion of a larger data communications network where neighboring cell interference negatively impacts quality of service, in accordance with an embodiment of the invention.

FIG. 14 illustrates a graph 1400 comparing before and after probability plots associated with CINR cumulative distribution function data for user equipment communicating within a portion of a larger data communications network where neighboring cell interference negatively impacts quality of service, in accordance with an embodiment of the invention. The vertical axis 1402 is a cumulative distribution function probability scale and the horizontal axis 1404 is a CINR measured in dB. The before plot 1408 depicts a CDF plot mapping the results of before plot 1200.

As can be seen from before plot 1408, 10% of the user equipment experience a CINR of less than or equal to 5 dB and 23% of the user equipment experience a CINR of less than or equal to 10 dB. In an embodiment, a CINR of less than 5 dB or 10 dB is seen by user equipment that are experiencing higher levels of interference from adjacent base stations and that are therefore the poorest performing user equipment. At the center of plot 1408, 50% of the user equipment experience a CINR of 16 dB or higher. In an embodiment, a CINR of 16 dB results in good performance for a user equipment. At the high end of plot 1408 it can be seen that 36% of the user equipment experience a CINR of greater than 20 dB. In an embodiment, the peak performance of a user equipment is achieved when the CINR is 20 dB. In an embodiment CINR values of greater than 20 dB result in equivalent performance to CINR values of 20 dB.

The after plot 1406 depicts a CDF plot mapping the results of after plot 1300. As can be seen from plot 1406 the CINR statistics have changed significantly. In this case, less than 1% of the user equipment are experiencing a CINR of less than 5 dB and less than 8% of the user equipment are experiencing a CINR of less than 10 dB. Compared with plot 1408 a considerably smaller percentage of user equipment are experiencing the poorest performance. At the center of plot 1406 50% of the user equipment is experiencing a CINR of 16 dB or greater, which is the same as in the before plot 1408. In plot 1406 only 12% of the user equipment are experiencing a CINR of 20 dB or greater. Compared with plot 1408 fewer user equipment are operating at peak performance, and fewer are operating at the poorest performance. The CINR of the highest performing user equipment has been traded off to improve the performance of the previously lowest performing user equipment.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A networked computing system for mitigating interference amongst neighboring base stations, the networked computing system comprising:
a plurality of base stations;
a plurality of user equipment;
at least one network resource controller; and a data communications network facilitating data communications amongst the plurality of base stations, the plurality of user equipment, and the at least one network resource controller, wherein a first base station is configured to:
acquire interference metrics from one or more user equipment; and
generate an aggregate representation from the acquired interference metrics, and wherein a network resource controller is configured to:
acquire the aggregate representation;
determine an interference reduction associated with a second base station for each of the user equipment serviced by the first base station;
determine a power schedule for the first base station based on the aggregate representation and the determined interference reduction; and
modify a power schedule for the second base station based on the determined interference reduction.

2. The networked computing system of claim 1, wherein the determined power schedule for the first base station and the modified power schedule for the second base station are both downlink power schedules.

3. The networked computing system of claim 1, wherein the modified power schedule for the second base station is configured to reduce interference for the user equipment serviced by the first base station.

4. The networked computing system of claim 1, wherein the network resource controller is further configured to:
determine an interference reduction associated with a third base station for each of the user equipment serviced by the first base station; and
modify a power schedule for the third base station based on the determined interference reduction associated with the third base station.

5. The networked computing system of claim 4, wherein the determined power schedules for the second and the third base stations are configured to reduce interference for the user equipment serviced by the first base station.

6. The networked computing system of claim 4, wherein the network resource controller is further configured to determine the interference reductions associated with the second and the third base stations by ranking the second and the third base stations in accordance with their proportional interference impact to the user equipment serviced by the first base station.

7. The networked computing system of claim 1, wherein the first base station generates a histogram of interference metrics and then transmits the histogram to the network resource controller to facilitate centralized power scheduling for neighboring base stations.

8. A computer-readable medium encoded with computer-executable instructions for mitigating interference amongst neighboring base stations, which when executed, performs a method comprising:
acquiring interference metrics from one or more user equipment at a first base station;
generating an aggregate representation from the acquired interference metrics;
acquiring the aggregate representation at a network resource controller;
determining an interference reduction associated with a second base station for each of the user equipment serviced by the first base station;
determining a power schedule for the first base station based on the aggregate representation and the determined interference reduction; and
modifying a power schedule for the second base station based on the determined interference reduction.

9. The computer-readable medium of claim 8, wherein the determined power schedule for the first base station and the modified power schedule for the second base station are both downlink power schedules.

10. The computer-readable medium of claim 8, wherein the modified power schedule for the second base station is configured to reduce interference for the user equipment serviced by the first base station.

11. The computer-readable medium of claim 8, wherein the method further comprises:
determining an interference reduction associated with a third base station for each of the user equipment serviced by the first base station; and
modifying a power schedule for the third base station based on the determined interference reduction associated with the third base station.

12. The computer-readable medium of claim 11, wherein the interference reductions associated with the second and the third base stations are determined by ranking the second and the third base stations in accordance with their proportional interference impact on the user equipment serviced by the first base station, and the determined power schedules for the second and the third base stations are configured to reduce interference for the user equipment serviced by the first base station.

13. The computer-readable medium of claim 8, wherein the method further comprises generating a histogram of interference metrics at the first base station and then transmitting the histogram to the network resource controller to facilitate centralized power scheduling for neighboring base stations.

14. A computer-implemented method for mitigating interference amongst neighboring base stations, the method comprising:
acquiring interference metrics from one or more user equipment at a first base station;
generating an aggregate representation from the acquired interference metrics;
acquiring the aggregate representation at a network resource controller;
determining an interference reduction associated with a second base station for each of the user equipment serviced by the first base station;
determining a power schedule for the first base station based on the aggregate representation and the determined interference reduction; and
modifying a power schedule for the second base station based on the determined interference reduction.

15. The computer-implemented method of claim 14, wherein the determined power schedule for the first base station and the modified power schedule for the second base station are both downlink power schedules.

16. The computer-implemented method of claim 14, wherein the modified power schedule for the second base station is configured to reduce interference for the user equipment serviced by the first base station.

17. The computer-implemented method of claim 14, wherein the method further comprises:
determining an interference reduction associated with a third base station for each of the user equipment serviced by the first base station; and
modifying a power schedule for the third base station based on the determined interference reduction associated with the third base station.

18. The computer-implemented method of claim 17, wherein the interference reductions associated with the second and the third base stations are determined by ranking the second and the third base stations in accordance with their proportional interference impact on the user equipment serviced by the first base station, and the determined power schedules for the second and the third base stations are configured to reduce interference for the user equipment serviced by the first base station.

19. The computer-implemented method of claim 14, wherein the method further comprises generating a histogram of interference metrics at the first base station and then transmitting the histogram to the network resource controller to facilitate centralized power scheduling for neighboring base stations.

20. A network resource controller for mitigating interference amongst neighboring base stations, the network resource controller comprising:
   at least one memory;
   at least one processor; and
   a data communications component,
   wherein the network resource controller is configured to:
      acquire an aggregate representation of user equipment interference metrics from a first base station;
      determine an interference reduction associated with a second base station for each of the user equipment;
      determine a power schedule for the first base station based on the aggregate representation and the determined interference reduction; and
      modify a power schedule for the second base station based on the determined interference reduction.

* * * * *